US012482592B2

(12) United States Patent
Yoshioka

(10) Patent No.: US 12,482,592 B2
(45) Date of Patent: Nov. 25, 2025

(54) INDUCTOR COMPONENT

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1129 days.

(21) Appl. No.: 17/409,982

(22) Filed: Aug. 24, 2021

(65) Prior Publication Data

US 2022/0068549 A1 Mar. 3, 2022

(30) Foreign Application Priority Data

Aug. 26, 2020 (JP) ................................ 2020-142766

(51) Int. Cl.

| | |
|---|---|
| ***H01F 27/28*** | (2006.01) |
| ***H01F 27/24*** | (2006.01) |
| ***H01F 27/29*** | (2006.01) |
| *B33Y 80/00* | (2015.01) |
| *H01F 41/04* | (2006.01) |

(52) U.S. Cl.

CPC ......... *H01F 27/2804* (2013.01); *H01F 27/24* (2013.01); *H01F 27/292* (2013.01); *B33Y 80/00* (2014.12); *H01F 41/041* (2013.01)

(58) Field of Classification Search

CPC ......... H01F 17/0013; H01F 2027/2809; H01F 17/0006; H01F 27/2804; H01F 5/003; H01F 27/29; H01F 27/292; H01F 27/28; H01F 27/24

USPC .................................................. 336/200, 232

See application file for complete search history.

(56) References Cited

U.S. PATENT DOCUMENTS

| | | | | |
|---|---|---|---|---|
| 6,191,667 | B1 * | 2/2001 | Takenaka | H01F 17/0006 336/232 |
| 2006/0170518 | A1 * | 8/2006 | Chang | H03H 7/1783 333/204 |
| 2019/0057801 | A1 * | 2/2019 | Lee | H01F 27/292 |
| 2019/0244743 | A1 * | 8/2019 | Hirai | H01F 41/12 |
| 2020/0105457 | A1 * | 4/2020 | Yasuda | H01F 27/29 |
| 2020/0128675 | A1 * | 4/2020 | Matsumoto | H05K 3/4658 |
| 2021/0125770 | A1 * | 4/2021 | Yoshioka | H01F 27/29 |
| 2022/0068548 | A1 * | 3/2022 | Yoshioka | H01F 27/292 |
| 2022/0068550 | A1 * | 3/2022 | Yoshioka | H01F 17/0006 |

(Continued)

FOREIGN PATENT DOCUMENTS

| | | | |
|---|---|---|---|
| CN | 106992062 | A | 7/2017 |
| CN | 110729109 | A | 1/2020 |
| JP | 10112409 | A * | 4/1998 |

(Continued)

*Primary Examiner* — Tszfung J Chan

(74) *Attorney, Agent, or Firm* — Studebaker Brackett PLLC

(57) ABSTRACT

A compact inductor component includes an element body having a principal surface. A first inductor wire and a second inductor wire extend in parallel with the principal surface in the element body. The number of turns of the second inductor wire is 0.25. The first inductor wire includes a first wire main body extending linearly. The second inductor wire includes a second wire main body extending linearly. The wire length of the second wire main body in the second inductor wire is 1.2 times or more the wire length of the first wire main body in the first inductor wire.

22 Claims, 10 Drawing Sheets

(56) References Cited

U.S. PATENT DOCUMENTS

| | | | | |
|---|---|---|---|---|
| 2022/0068553 | A1* | 3/2022 | Yoshioka | H01F 27/292 |
| 2022/0071012 | A1* | 3/2022 | Yoshioka | H01F 27/2823 |

FOREIGN PATENT DOCUMENTS

| | | | | | |
|---|---|---|---|---|---|
| JP | H10-112409 | A | | 4/1998 | |
| JP | 2000133521 | A | * | 5/2000 | |
| JP | 2001144136 | A | * | 5/2001 | |
| JP | 2008078226 | A | * | 4/2008 | |
| JP | 2017130584 | A | * | 7/2017 | H01F 17/0013 |
| JP | 2017-228764 | A | | 12/2017 | |
| JP | 2017216773 | A | * | 12/2017 | H01F 17/0013 |
| JP | 2019121780 | A | * | 7/2019 | H01F 27/24 |
| JP | 2019176109 | A | * | 10/2019 | H01F 27/2804 |
| JP | 2020-013855 | A | | 1/2020 | |

* cited by examiner

INDUCTOR COMPONENT

CROSS-REFERENCE TO RELATED APPLICATION

This application claims benefit of priority to Japanese Patent Application No. 2020-142766, filed Aug. 26, 2020, the entire content of which is incorporated herein by reference.

BACKGROUND

Technical Field

The present disclosure relates to an inductor component.

Background Art

The inductor component disclosed in Japanese Patent Application Laid-Open No. 2017-228764 includes an element body including a magnetic layer. In the element body, a first coil pattern and a second coil pattern having different electrical properties from each other are provided as inductor wires. The first coil pattern and the second coil pattern both extend in a spiral shape. The first coil pattern and the second coil pattern are disposed in different layers.

SUMMARY

In the inductor component of Japanese Patent Application Laid-Open No. 2017-228764, it is considered that the first coil pattern and the second coil pattern are disposed in the same layer in order to reduce the dimension in the thickness direction. However, in the inductor component of Japanese Patent Application Laid-Open No. 2017-228764, the first coil pattern and the second coil pattern are in a spiral shape. Therefore, when the first coil pattern and the second coil pattern are to be disposed in the same layer, it is necessary to ensure a large area enough to dispose the two spiral patterns as the area of the layer. That is, in exchange for reducing the dimension in the thickness direction, it is necessary to increase the dimension in the direction orthogonal to the thickness direction, which hinders downsizing the inductor component.

Accordingly, an aspect of the present disclosure provides an inductor component including an element body having a principal surface; a plurality of inductor wires disposed on an identical plane in the element body, the plurality of inductor wires extending in parallel with the principal surface; and a first vertical wire and a second vertical wire extending in a thickness direction from the inductor wires toward the principal surface. The first vertical wire and the second vertical wire are exposed from the principal surface. The inductor wire has a wire main body having a number of turns of 0.5 turns or less. The wire main body extends linearly. A first pad is provided at a first end of the wire main body, with the first pad being connected to the first vertical wire. A second pad is provided at a second end of the wire main body, the second pad being connected to the second vertical wire. When one of the plurality of inductor wires is a first inductor wire and another is a second inductor wire, a wire length of the wire main body in the second inductor wire is 1.2 times or more a wire length of the wire main body in the first inductor wire.

According to the configuration, the plurality of inductor wires having different wire lengths are disposed on the same plane in the element body. Therefore, the inductor component is less likely to become large in the thickness direction. Since the number of turns of the inductor wires is 0.5 turns or less, on the occasion in which a plurality of inductor wires is disposed on the same plane, the inductor wire does not spread on the plane, which can contribute to downsizing the inductor component.

According to the configuration, the wire length of the second inductor wire is longer than that of the first inductor wire. Therefore, the difference in wire length is reflected, and the inductance value of the second inductor wire becomes larger than the inductance value of the first inductor wire. Therefore, an inductor wire through which an electric current is flowed, and an inductance value suitable for the use state of the inductor component can be acquired.

It is possible to suppress an increase in the size of the inductor component.

DETAILED DESCRIPTION

In the following, an inductor component will be described. It should be noted that the drawings sometimes show components in scaling up for easy understanding. The dimensions and ratios of the components sometimes different from those in other drawing.

Figure 1:
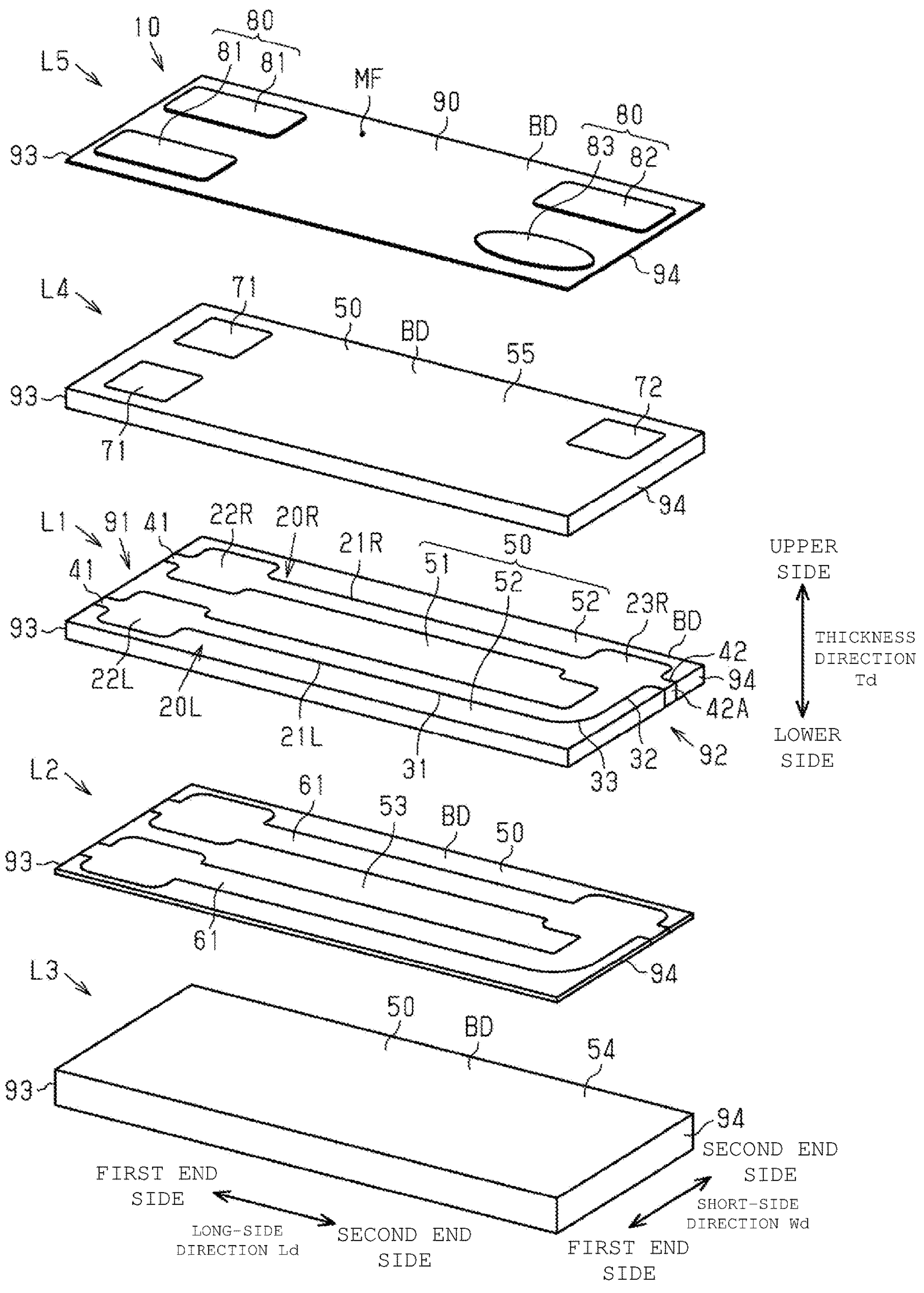
FIG. 1 is an exploded perspective view of an inductor component.

As shown in FIG. 1, an inductor component 10 has a structure such that five layers are stacked in a thickness direction Td as a whole. It should be noted that in the following description, one side in the thickness direction Td is defined as the upper side and the opposite side of the one side is defined as the lower side.

A first layer L1 is composed of a first inductor wire 20R, a second inductor wire 20L, a first support wire 41, a second support wire 42, an inner magnetic path 51, and an outer magnetic path 52.

The first layer L1 is in a rectangular shape when viewed from the thickness direction Td. It should be noted that a direction along the long side of the rectangular shape is defined as a long-side direction Ld, and a direction along the short side is defined as a short-side direction Wd.

The first inductor wire 20R is formed of a first wire main body 21R, a first pad 22R provided at the first end of the first wire main body 21R, and a second pad 23R provided at the second end of the first wire main body 21R. The first wire main body 21R extends linearly in the long-side direction Ld of the first layer L1. In the first wire main body 21R, the first pad 22R is connected to the first end on the first end side in the long-side direction Ld. The dimension of the first pad 22R in the short-side direction Wd is larger than the dimension of the first wire main body 21R in the short-side direction Wd. The first pad 22R is in a nearly square shape when viewed from the thickness direction Td. In the first wire main body 21R, the second pad 23R is connected to the second end on the second end side in the long-side direction Ld. The dimension of the second pad 23R in the short-side direction Wd is larger than the dimension of the first wire main body 21R in the short-side direction Wd. The second pad 23R is in a nearly square shape the same as the first pad 22R when viewed from the thickness direction Td. It should be noted that the first inductor wire 20R is disposed close to the first layer L1 on the second end side in the short-side direction Wd.

The second inductor wire 20L includes a second wire main body 21L, a first pad 22L provided at a first end of the second wire main body 21L, and the above-described second pad 23R provided at a second end of the second wire main body 21L.

The second wire main body 21L has two linear portions and a part connecting the two linear portions, and extends in an L shape as a whole. Specifically, the second wire main body 21L is composed of a long linear portion 31 extending in the long-side direction Ld, a short linear portion 32 extending in the short-side direction Wd, and a connection portion 33 connecting these parts to each other.

Figure 2:
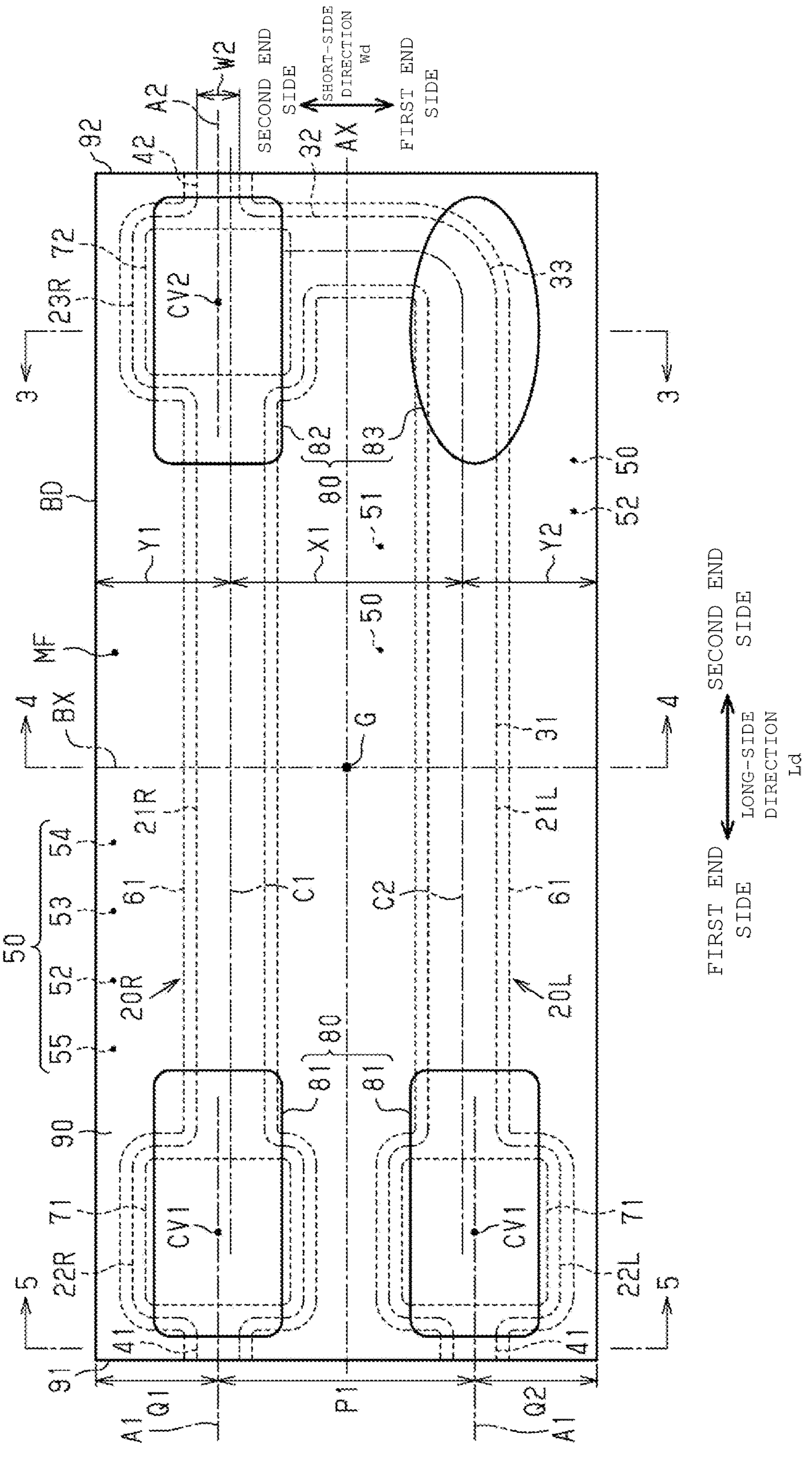
FIG. 2 is a transparent top view of an inductor component.

As shown in FIG. 2, when a straight line passing the center of the first layer L1 in the short-side direction Wd and extending in the long-side direction Ld is a symmetry axis AX, the long linear portion 31 is disposed at a position in line symmetry to the first wire main body 21R, relative to the symmetry axis AX. The length of the long linear portion 31 extending in the long-side direction Ld is slightly longer than the length of the first wire main body 21R extending in the long-side direction Ld. The dimension of the long linear portion 31 in the short-side direction Wd is equal to the dimension of the first wire main body 21R in the short-side direction Wd. The end of the long linear portion 31 on the first end side in the long-side direction Ld is connected to the first pad 22R. The second end on the second end side in the long-side direction Ld of the long linear portion 31 is connected to the first end of the connection portion 33.

The second end of the connection portion 33 that is not connected to the long linear portion 31 is directed to the second end side in the short-side direction Wd. That is, the second wire main body 21L, the connection portion 33 is curved at an angle of 90 degrees from the first end side in the long-side direction Ld toward the second end side in the short-side direction Wd.

The second end of the connection portion 33 directed to on the second end side in the short-side direction Wd is connected to the first end of the short linear portion 32. The dimension of the short linear portion 32 in the long-side direction Ld is equal to the dimension of the long linear portion 31 in the short-side direction Wd. The second end of the short linear portion 32 directed to the second end side in the short-side direction Wd is connected to the second pad 23R that is connected to the first wire main body 21R. That is, the second pad 23R of the first inductor wire 20R is the same pad as the second pad 23R of the second inductor wire 20L. In other words, the first inductor wire 20R and the second inductor wire 20L have the second pad 23R in common.

The number of turns of the second inductor wire 20L is determined based on a virtual vector. The starting point of the virtual vector is disposed on the center axis C2 extending in the direction of extending the second wire main body 21L through the center of the wire width of the second wire main body 21L. Then, when the virtual vector is moved from the state in which the starting point of the second wire main body 21L is disposed at the first end to the second end of the center axis C2 when viewed from the thickness direction Td, the number of turns is determined as 1.0 turns when the angle at which the direction of the virtual vector is rotated is 360 degrees. However, in the case in which the direction of the virtual vector is wound a plurality of times, the number of turns is assumed to increase in the case in which the virtual vector is continuously wound in the same direction. In the case in which the virtual vector is wound in a direction different from the direction of the previous winding, the number of turns is counted again from zero turns. For example, in the case in which the virtual vector is wound clockwise at an angle of 180 and then wound counterclockwise at an angle of 180, the number of turns is 0.5 turns. In the present embodiment, the orientation of the virtual vector virtually disposed on the second wire main body 21L is rotated at an angle of 90 at the connection portion 33. Therefore, the number of turns at which the second wire main body 21L is wound is 0.25 turns. It should be noted that the center axis C2 of the second wire main body 21L is a line that follows the intermediate points of the second wire main body 21L in the direction orthogonal to the direction in which the second wire main body 21L extends. That is, the center axis C2 of the second wire main body 21L is in a nearly L shape when viewed from the thickness direction Td.

As shown in FIG. 2, the first pad 22L is connected to the first end of the long linear portion 31 of the second wire main body 21L on the first end side in the long-side direction Ld. The first pad 22L is in a shape the same as the shape of the first pad 22R connected to the first wire main body 21R. That is, the first pad 22L is in a nearly square shape when viewed from the thickness direction Td. The first pad 22L is disposed in line symmetry to the first pad 22R connected to the first wire main body 21R relative to the symmetry axis AX.

In the first layer L1, from the first pad 22R on the opposite side of the first wire main body 21R, the first support wire 41 extends. That is, the first support wire 41 extends from the edge of the first pad 22R on the first end side in the long-side direction Ld. The first support wire 41 linearly extends in parallel with the long-side direction Ld. The first support wire 41 extends to a first side surface 91 on the first end side in the long-side direction Ld of the first layer L1, and is exposed from the first side surface 91. Similarly, on the first layer L1, the first support wire 41 also extends from the first pad 22L on the opposite side of the second wire main body 21L.

In the first layer L1, from the second pad 23R on the opposite side of the first wire main body 21R, the second support wire 42 extends. That is, the second support wire 42 extends from the edge of the second pad 23R on the second end side in the long-side direction Ld. The second support wire 42 linearly extends in parallel with the long-side direction Ld. The second support wire 42 extends to a second side surface 92 on the second end side in the long-side direction Ld of the first layer L1, and is exposed from the second side surface 92. It should be noted that in the present embodiment, no support wire is provided on the opposite side of the second pad 23R to the short linear portion 32 of the second wire main body 21L.

The first inductor wire 20R and the second inductor wire 20L are made of a conductive material. In the present embodiment, the composition of the first inductor wire 20R and the second inductor wire 20L can be such that the copper ratio is 99 wt % or more and the sulfur ratio is 0.1 wt % or more and 1.0 wt % or less (i.e., from 0.1 wt % to 1.0 wt %).

The materials of the first support wire 41 and the second support wire 42 are a conductive material the same as the materials of the first inductor wire 20R and the second inductor wire 20L. However, in the first support wire 41, a part including an exposed surface 41A exposed from the first side surface 91 is a Cu oxide. Similarly, in the second support wire 42, a part including an exposed surface 42A exposed from the second side surface 92 is a Cu oxide.

As shown in FIG. 1, in the first layer L1, the region between the first inductor wire 20R and the second inductor wire 20L is an inner magnetic path 51. The material of the inner magnetic path 51 is an organic resin containing metal magnetic powder. In this embodiment, the metal magnetic powder is metal magnetic powder made of an Fe-based alloy or an amorphous alloy of the Fe-based alloy. More specifically, the metal magnetic powder is an FeSiCr-based metal powder containing iron. The mean particle size of the metal magnetic powder can be approximately five micrometers.

It should be noted that in this embodiment, the particle size of the metal magnetic powder is the longest length of a line drawn from the edge to the edge in the sectional form the metal magnetic powder appearing in a section of the inner magnetic path 51 that is cut. The mean particle size is the mean of the particle sizes of the metal magnetic powder at three or more random points in the metal magnetic powder appearing in the section of the inner magnetic path 51 that is cut.

In the first layer L1, when viewed from the thickness direction Td, the region on the second end side in the short-side direction Wd from the first inductor wire 20R and the region on the first end side in the short-side direction Wd from the second inductor wire 20L are the outer magnetic path 52. The material of the outer magnetic path 52 is a magnetic material the same as the material of the inner magnetic path 51.

In the present embodiment, the dimension of the first layer L1 in the thickness direction Td, i.e., the dimension of the first inductor wire 20R, the second inductor wire 20L, the first support wire 41, and the second support wire 42 in the thickness direction Td can be approximately 40 micrometers.

On the under surface that is the surface of the first layer L1 on the lower side in the thickness direction Td, a second layer L2 in a rectangular shape the same as the shape of the first layer L1 when viewed from the thickness direction Td is stacked. The second layer L2 is composed of two insulating resins 61 and an insulating resin magnetic layer 53.

The insulating resin 61 covers the first inductor wire 20R, the second inductor wire 20L, the first support wire 41, and the second support wire 42 from the lower side in the thickness direction Td. When viewed from the thickness direction Td, the insulating resin 61 has a shape that covers a range slightly wider than the outer edges of the first inductor wire 20R, the second inductor wire 20L, the first support wire 41, and the second support wire 42. As a result, the one insulating resin 61 is in a straight belt shape. The other insulating resin 61 has a band shape extending in a nearly L shape. The material of the insulating resin 61 is an insulating resin, and in this embodiment, a polyimide-based resin, for example, can be used. The insulating resin 61 has the insulating properties higher than those of the first inductor wire 20R and the second inductor wire 20L. Two insulating resins 61 are provided side by side in the short-side direction Wd corresponding to the number and the arrangement of the first inductor wire 20R and the second inductor wire 20L, and are connected to each other at the ends.

In the second layer L2, parts except the two insulating resins 61 are the insulating resin magnetic layer 53. The material of the insulating resin magnetic layer 53 is a magnetic material the same as the materials of the inner magnetic path 51 and the outer magnetic path 52 described above.

On the under surface that is the surface of the second layer L2 on the lower side in the thickness direction Td, a third layer L3 in a rectangular shape the same as the shape of the second layer L2 when viewed from the thickness direction Td is stacked. The third layer L3 is a first magnetic layer 54. Therefore, the first magnetic layer 54 is disposed on the lower side from the first inductor wire 20R and the second inductor wire 20L. The material of the first magnetic layer 54 is an organic resin containing metal magnetic powder the same as the materials of the inner magnetic path 51, the outer magnetic path 52, and the insulating resin magnetic layer 53.

On the other hand, on the top surface that is the surface of the first layer L1 on the upper side in the thickness direction Td, a fourth layer L4 in a rectangular shape the same as the shape of the first layer L1 when viewed from the thickness direction Td is stacked. The fourth layer L4 is formed of two first vertical wires 71, a second vertical wire 72, and a second magnetic layer 55.

The first vertical wire 71 is directly connected to the top surfaces of the first pads 22R and 22L in the first inductor wire 20R and the second inductor wire 20L with no other layer interposed therebetween. That is, to the first pad 22R, the first vertical wire 71, the first end of the first wire main body 21R, and the first support wire 41 are connected. To the first pad 22L, the first vertical wire 71, the first end of the second wire main body 21L, and the first support wire 41 are connected. The two first vertical wires 71 are disposed at positions in line symmetry relative to the symmetry axis AX. The material of the first vertical wire 71 is a material the same as the materials of the first inductor wire 20R and the second inductor wire 20L. The first vertical wire 71 is in a regular quadrangular prism shape, and the axial direction of the regular quadrangular prism is matched with the thickness direction Td.

As shown in FIG. 2, when viewed from the thickness direction Td, the dimensions of the edges of the square-shaped first vertical wire 71 are slightly smaller than the dimensions of the edges of the square-shaped first pads 22R and 22L. Therefore, the area of the first pads 22R and 22L is larger than the area of the first vertical wire 71 at the connection point to the first pads 22R and 22L. When viewed from above in the thickness direction Td, the center axis CV1 of the first vertical wire 71 is matched with the geometric center of the first pads 22R and 22L in a nearly square shape. Two first vertical wires 71 are provided corresponding to the number of the first pads 22R and 22L.

As shown in FIG. 1, the second vertical wire 72 is directly connected to the top surface of the second pad 23R in the first inductor wire 20R with no other layer interposed therebetween. That is, to the second pad 23R, the second vertical wire 72, the second end of the first wire main body 21R, the second end of the second wire main body 21L, and the second support wire 42 are connected. The second vertical wire 72 is made of a material the same as the material of the first inductor wire 20R. The second vertical wire 72 is in a regular quadrangular prism shape, and the axial direction of the regular quadrangular prism is matched with the thickness direction Td.

As shown in FIG. 2, when viewed from the thickness direction Td, the dimensions of the edges of the second vertical wire 72 in a square shape is slightly smaller than the dimensions of the edges of the square-shaped second pad 23R. Therefore, the area of the second pad 23R is larger than the area of the second vertical wire 72 at the connection point to the second pad 23R. It should be noted that when viewed from the upper side in the thickness direction Td, the center axis CV2 of the second vertical wire 72 is matched with the geometric center of the second pad 23R in a nearly square shape. One second vertical wire 72 is provided corresponding to the number of the second pads 23R.

As shown in FIG. 1, in the fourth layer L4, parts except two first vertical wires 71 and one second vertical wire 72 are a second magnetic layer 55. Therefore, the second magnetic layer 55 is stacked on the top surfaces of the first inductor wire 20R, the second inductor wire 20L, and the support wires 41 and 42. The material of the second magnetic layer 55 is a material the same as the material of the first magnetic layer 54 described above.

In the inductor component 10, the magnetic layer 50 is composed of the inner magnetic path 51, the outer magnetic path 52, the insulating resin magnetic layer 53, the first magnetic layer 54, and the second magnetic layer 55. The inner magnetic path 51, the outer magnetic path 52, the insulating resin magnetic layer 53, the first magnetic layer 54, and the second magnetic layer 55 are connected to each other, and surround the first inductor wire 20R and the second inductor wire 20L. As described above, the magnetic layer 50 forms a closed magnetic circuit for the first inductor wire 20R and the second inductor wire 20L. Therefore, the first inductor wire 20R and the second inductor wire 20L extend in the inside of the magnetic layer 50. It should be noted that although the inner magnetic path 51, the outer magnetic path 52, the insulating resin magnetic layer 53, the first magnetic layer 54, and the second magnetic layer 55 are shown separately, these components are integrated as the magnetic layer 50, and a boundary is sometimes not confirmed.

On the top surface that is the surface of the fourth layer L4 on the upper side in the thickness direction Td, a fifth layer L5 in a rectangular shape the same as the shape of the fourth layer L4 when viewed from the thickness direction Td is stacked. The fifth layer L5 is composed of four terminal portions 80 and an insulating layer 90. Two of the four terminal portions 80 are first external terminals 81 electrically connected to the first inductor wire 20R or the second inductor wire 20L with the first vertical wire 71 interposed therebetween. One of the four terminal portions 80 is the second external terminal 82 electrically connected to the first inductor wire 20R and the second inductor wire 20L with the second vertical wire 72 interposed therebetween. The remaining one of the four terminal portions 80 except the first external terminals 81 and the second external terminal 82 is a dummy portion 83 that is not electrically connected to any of the first inductor wire 20R and the second inductor wire 20L.

As shown in FIG. 2, when a virtual straight line BX passing the center of the fifth layer L5 in the long-side direction Ld and parallel with the short-side direction Wd is drawn, a point on the top surface of the fifth layer L5 on which the symmetry axis AX intersects with the virtual straight line BX is the geometric center G of the fifth layer L5. The four terminal portions 80 are disposed at two-fold rotational symmetry positions to the geometric center G of the fifth layer L5 when viewed from the thickness direction Td.

The first external terminal 81 is directly connected to the top surface of the first vertical wire 71 with no other layer interposed therebetween. The first external terminal 81 is in a rectangular shape when viewed from the thickness direction Td, and is also located on the second magnetic layer 55. The area of the first external terminal 81 in contact with the first vertical wire 71 is a half of the overall area of the first external terminal 81 or less. The long side of the rectangle of the first external terminal 81 extends in parallel with the long-side direction Ld of the fifth layer L5, and the short side extends in parallel with the short-side direction Wd of the fifth layer L5. Two first external terminals 81 are provided corresponding to the number of the first vertical wires 71.

The second external terminal 82 is directly connected to the top surface of the second vertical wire 72 with no other layer interposed therebetween. The area of the second external terminal 82 in contact with the second vertical wire 72 is a half of the overall area of the second external terminal 82 or less. The second external terminal 82 is in a rectangular shape when viewed from the thickness direction Td, and is also located on the second magnetic layer 55. The long side of the rectangle of the second external terminal 82 extends in parallel with the long-side direction Ld of the fifth layer L5, and the short side extends in parallel with the short-side direction Wd of the fifth layer L5.

Figure 3:
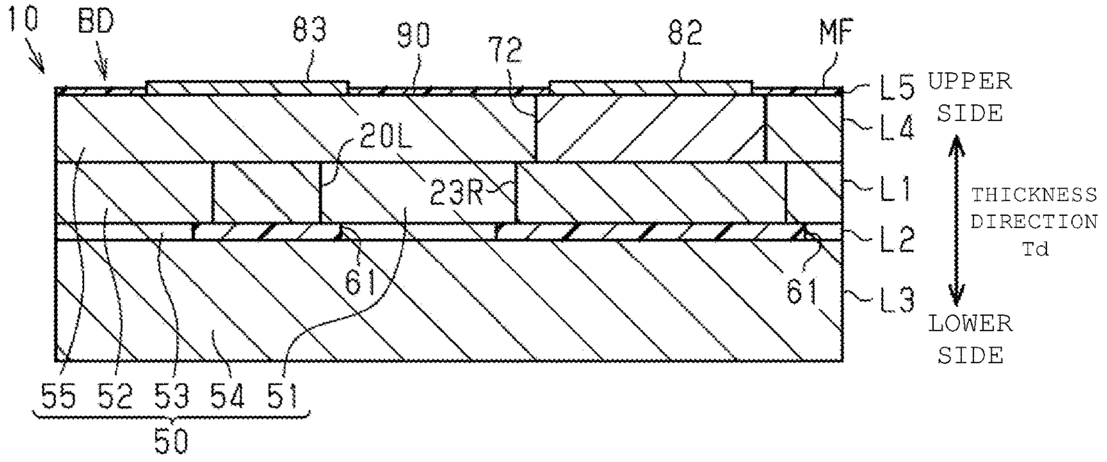
FIG. 3 is a sectional view of the inductor component taken along line 3-3 in FIG. 2.

One of the four terminal portions 80 is a dummy portion 83. As shown in FIG. 3, the dummy portion 83 is directly connected to the top surface of the second magnetic layer 55 of the fourth layer L4 with no other layer interposed therebetween. As shown in FIG. 2, the dummy portion 83 has a shape different from the shapes of the first external terminal 81 and the second external terminal 82 when viewed from the thickness direction Td. In the present embodiment, the dummy portion 83 is in an elliptical shape when viewed from the thickness direction Td. On the other hand, the shape of the dummy portion 83 is not limited to this, and may be, for example, a rectangular shape or a circular shape different from the shapes of the first external terminal 81 and the second external terminal 82. The major axis of the ellipse of the dummy portion 83 extends in parallel with the long-side direction Ld of the fifth layer L5, and the minor axis extends in parallel with the short-side direction Wd of the fifth layer L5.

When viewed from the thickness direction Td, most of the dummy portion 83 overlaps with the second inductor wire 20L. When viewed from the thickness direction Td, the area of the dummy portion 83 is the same as the areas of the first external terminal 81 and the second external terminal 82. It should be noted that in the present embodiment, "having the same area" permits manufacturing errors. Therefore, when the difference between the area of the dummy portion 83 and the areas of the first external terminal 81 and the second external terminal 82 is within ±10%, it can be considered that the areas are equal.

The four terminal portions 80 is formed of a plurality of conductive layers. Specifically, the structure is a three-layer structure of copper, nickel, and gold. It should be noted that when viewed from the thickness direction Td, the second magnetic layer 55 and the first vertical wire 71 provided on the lower side in the thickness direction Td are sometimes seen through the first external terminal 81. The region in which the first vertical wire 71 is seen through the first external terminal 81 is a region a half of the first external terminal 81 or less when viewed from the thickness direction Td.

Similarly, in the second external terminal 82, the second magnetic layer 55 and the second vertical wire 72 provided on the lower side in the thickness direction Td are sometimes seen through. The region in which the second vertical wire 72 is seen through the second external terminal 82 is a region a half of the second external terminal 82 or less when viewed from the thickness direction Td.

In the dummy portion 83, the second magnetic layer 55 provided on the lower side in the thickness direction Td is sometimes seen through. On the other hand, the region of the second magnetic layer 55 seen through from the first external terminal 81 is a half of the region of the first external terminal 81 or more. The region of the second magnetic layer 55 seen through from the second external terminal 82 is a half of the region of the second external terminal 82 or more. That is, when viewed from the thickness direction Td, the region of the overall dummy portion 83 and the regions a half of the first external terminal 81 and the second external terminal 82 have optically the same color. Here, the same color is regarded as the same color when, for example, a difference between numerical values indicating RGB falls within a predetermined range with the use of a color difference meter. It should be noted that a predetermined range is 10%, for example.

In the fifth layer L5, parts except the terminal portion 80 is the insulating layer 90. In other words, a range of the top surface of the fourth layer L4 that is not covered with the two first external terminals 81, the one second external terminal 82, and the one dummy portion 83 is covered with the insulating layer 90 of the fifth layer L5. The insulating layer 90 has the insulating properties higher than those of the magnetic layer 50, and in the present embodiment, the insulating layer 90 is a solder resist. The dimension in the thickness direction Td of the insulating layer 90 is smaller than the dimension of any component of the terminal portion 80 in the thickness direction Td.

In the present embodiment, an element body BD is composed of the magnetic layer 50, the insulating resin 61, and the insulating layer 90. That is, the element body BD is in a rectangular shape when viewed from the thickness direction Td. In the present embodiment, the dimension of the element body BD in the thickness direction Td can be approximately 0.2 mm.

In the surface of the element body BD, the surface of the insulating layer 90 on the upper side in the thickness direction Td is a principal surface MF. Therefore, the first inductor wire 20R and the second inductor wire 20L extend in parallel with the principal surface MF of the element body BD. The first vertical wire 71 extends in the thickness direction Td from the first pad 22R of the first inductor wire 20R toward the principal surface MF. Similarly, the first vertical wire 71 extends from the first pad 22L of the second inductor wire 20L toward the principal surface MF. The first vertical wire 71 is exposed from the principal surface MF. The first vertical wire 71 extends in the thickness direction Td from the first pad 22L of the second inductor wire 20L toward the principal surface MF. The first vertical wire 71 is exposed from the principal surface MF.

From the second pad 23R, the second vertical wire 72 extends in the thickness direction Td toward the principal surface MF. The second vertical wire 72 is exposed from the principal surface MF. The top surface of the terminal portion 80 is exposed from the principal surface MF, and is located on the upper side in the thickness direction Td from the principal surface MF. That is, the outer edges of the terminal portions 80 including the dummy portion 83 are in contact with the insulating layer 90. It should be noted that as in the present embodiment, at least a part of the surfaces of the first vertical wire 71 and the second vertical wire 72 exposed from the principal surface MF may be covered with the first external terminal 81 and the second external terminal 82.

The element body BD has a first side surface 93 vertical to the principal surface MF. It should be noted that the first side surface 91 of the first layer L1 is a part of the first side surface 93 of the element body BD. The element body BD has a second side surface 94 that is a side surface vertical to the principal surface MF and in parallel with the first side surface 93. It should be noted that the second side surface 92 of the first layer L1 is a part of the second side surface 94 the element body BD. That is, the first support wire 41 extends from the first inductor wire 20R in parallel with the principal surface MF, and has its end exposed from the first side surface 93 of the element body BD. Similarly, the second support wire 42 extends from the first inductor wire 20R in parallel with the principal surface MF, and has its end exposed from the second side surface 94 of the element body BD.

In the present embodiment, the geometric center G of the fifth layer L5 is matched with the geometric center G of the principal surface MF when viewed from the thickness direction Td. The geometric center G of the principal surface MF is matched with the geometric center G of the element body BD.

As shown in FIG. 2, on the principal surface MF, the dummy portion 83 is not provided on the first end side in the long-side direction Ld from the geometric center G in the short-side direction Wd in which the virtual straight line BX extends. On the principal surface MF, the dummy portions 83 in the number the same as the number of the second external terminals 82 are provided on the second end side in the long-side direction Ld from the geometric center G in the short-side direction Wd in which the virtual straight line BX extends.

Next, the wires will be described in detail.

As shown in FIG. 2, when viewed from the thickness direction Td, the center axis C1 of the first wire main body 21R extends in the long-side direction Ld. It should be noted that the center axis C1 of the first wire main body 21R is a line that follows the intermediate points of the first wire main body 21R in the direction orthogonal to the direction in which the first wire main body 21R extends, i.e., in the short-side direction Wd.

As described above, the center axis C2 of the second wire main body 21L of the second inductor wire 20L extends in a nearly L shape. Here, the wire length of the long linear portion 31 of the second wire main body 21L is longer than the wire length of the first wire main body 21R. In addition to this, the second wire main body 21L has the connection portion 33 and the short linear portion 32. Therefore, the wire length of the second wire main body 21L is longer than the wire length of the first wire main body 21R. Specifically, the wire length of the second wire main body 21L is 1.2 times or more the wire length of the first wire main body 21R.

The inductance value of the second inductor wire 20L is 1.1 times or more the inductance value of the first inductor wire 20R in the reflection of the difference in the wire length. In the present embodiment, the inductance value of the first inductor wire 20R can be approximately 2.5 nH.

The first wire main body 21R of the first inductor wire 20R extends along one side of the outer edge of the element body BD in the long-side direction Ld. The first pad 22L and the second pad 23R of the second inductor wire 20L are disposed at positions in symmetry to the geometric center G of the element body BD. In the present embodiment, the first pad 22L and the second pad 23R of the second inductor wire 20L are disposed at positions in two-fold symmetry to the geometric center G.

The first inductor wire 20R has parallel portions extending in parallel with the second inductor wire 20L. Specifically, the first wire main body 21R and the long linear portion 31 of the second wire main body 21L correspond to the parallel portions. The first wire main body 21R and the long linear portion 31 are arranged side by side in the short-side direction Wd in the first layer L1. It should be noted that the parallel portions may be substantially parallel, and a manufacturing error is permitted.

In the following description, a distance between the center axis C1 of the first wire main body 21R and the center axis C2 of the long linear portion 31 of the second wire main body 21L in the short-side direction Wd orthogonal to the direction in which the parallel portions extend and in which the parallel portions are arranged side by side is defined as a pitch X1 between the wire main bodies. That is, the pitch between the wire main bodies is the pitch between adjacent parallel portions.

The gap between the adjacent parallel portions, i.e., the distance between the first end side in the short-side direction Wd of the first wire main body 21R and the second end side in the short-side direction Wd of the long linear portion 31 of the second wire main body 21L in FIG. 2 is approximately 200 micrometers, for example.

As shown in FIG. 2, a distance from a center axis C1 of the first wire main body 21R, which is a parallel portion located on the second end side in the short-side direction Wd, to an end of the element body BD in the short-side direction Wd closest to the first wire main body 21R, i.e., an end on the second end side is defined as a first distance Y1.

A distance from the center axis C2 of the long linear portion 31, which is a parallel portion located on the first end side in the short-side direction Wd, to an end of the element body BD in the short-side direction Wd closest to the long linear portion 31, i.e., an end on the first end side is defined as a second distance Y2. In the present embodiment, the first distance Y1 has the same dimension as the second distance Y2.

In the short-side direction Wd, the pitch X1 between the wire main bodies is different in dimensions from the first distance Y1 and the second distance Y2. Specifically, the pitch X1 between the wire main bodies can be approximately "250 micrometers". The first distance Y1 and the second distance Y2 can be approximately "175 micrometers". As described above, the first distance Y1 and the second distance Y2 are preferably slightly larger than a half of the pitch X1.

In the present embodiment, the mean value of the pitch X1, the first distance Y1, and the second distance Y2 is "200 micrometers". The ratio of the pitch X1 to the mean value is "125%". The ratio of the first distance Y1 and the second distance Y2 to the mean value is "87.5%". Therefore, the ratio of the pitch X1, the first distance Y1, and the second distance Y2 to the mean value is 50% or more and 150% or less (i.e., from 50% to 150%).

The center axis A1 of the first support wire 41 connected to the first pad 22R of the first inductor wire 20R extends in the long-side direction Ld. The center axis A1 of the first support wire 41 is a line that follows the intermediate points of the first support wire 41 in a direction orthogonal to the direction in which the first support wire 41 extends, i.e., in the short-side direction Wd.

The center axis A1 of the first support wire 41 is located on the outer side of the center axis C1 of the first wire main body 21R in the short-side direction Wd. That is, the center axis A1 of the first support wire 41 connected to the first inductor wire 20R and the center axis C1 of the first wire main body 21R are located on different straight lines.

The extension line of the center axis A1 of the first support wire 41 passes the center axis CV1 of the first vertical wire 71. That is, the extension line of the center axis A1 of the first support wire 41 passes the center of the connection surface of the first vertical wire 71 to the first pad 22R.

The center axis A1 of the first support wire 41 connected to the first pad 22L of the second inductor wire 20L extends in the long-side direction Ld. The center axis A1 of the first support wire 41 is a line that follows the intermediate points of the first support wire 41 in a direction orthogonal to the direction in which the first support wire 41 extends, i.e., in the short-side direction Wd.

The center axis A1 of the first support wire 41 is located on the outer side in the short-side direction Wd from the center axis C2 of the second wire main body 21L. That is, the extension line of the center axis A1 of the first support wire 41 connected to the second inductor wire 20L and the center axis C2 of the second wire main body 21L are located on different straight lines.

The extension line of the center axis A1 of the first support wire 41 passes the center axis CV1 of the first vertical wire 71. That is, the extension line of the center axis A1 of the first support wire 41 passes the center of the connection surface of the first vertical wire 71 to the first pad 22L.

It should be noted that the first support wire 41 connected to the first inductor wire 20R and the first support wire 41 connected to the second inductor wire 20L are disposed in line symmetry relative to the symmetry axis AX.

A center axis A2 of the second support wire 42 is extends in the long-side direction Ld. The center axis A2 of the second support wire 42 is a line that follows the intermediate points of the second support wire 42 in the direction orthogonal to the direction in which the second support wire 42 extends, i.e., in the short-side direction Wd.

The center axis A2 of the second support wire 42 is located on the outer side of the center axis C1 of the first wire main body 21R in the short-side direction Wd. That is, the center axis A2 of the second support wire 42 and the center axis C1 of the first wire main body 21R are located on different straight lines.

On the center axis A2 of the second support wire 42, the second vertical wire 72 is disposed. The extension line of the center axis A2 of the second support wire 42 passes the center axis CV2 of the second vertical wire 72. That is, the extension line of the center axis A2 of the second support wire 42 passes the center of the connection surface of the second vertical wire 72 to the second pad 23R.

The first support wire 41 and the second support wire 42 extending from the first inductor wire 20R are disposed at the same position in the short-side direction Wd. That is, the center axis A1 of the first support wire 41 and the center axis A2 of the second support wire 42 are located on the same straight line. It should be noted that when a displacement is within 10% based on the minimum line width of the first inductor wire 20R and the second inductor wire 20L, the center axes A1 and A2 are regarded as located on the same straight line. Specifically, the minimum line width of the first inductor wire 20R and the second inductor wire 20L in the present embodiment can be 50 micrometers, which is the line width of the first wire main body 21R and the second wire main body 21L. Therefore, the term "located on the same straight line" in the present embodiment means the case in which the shortest distance between two axes is within five micrometers, and the term "located on the different straight line" means the case in which the shortest distance between two axes exceeds five micrometers.

As described above, in the first layer L1, the first support wires 41 are disposed in line symmetry relative to the symmetry axis AX. Therefore, as shown in FIG. 2, a distance Q1 from the end of the element body BD on the second end side in the short-side direction Wd to the center axis A1 of the first support wire 41 extending from the first inductor wire 20R is the same as a distance Q2 from the end of the element body BD on the first end side in the short-side direction Wd to the center axis A1 of the first support wire 41 extending from the second inductor wire 20L.

On the other hand, in the short-side direction Wd, the pitch P1 from the center axis A1 of the first support wire 41 extending from the first inductor wire 20R to the center axis A1 of the first support wire 41 extending from the second inductor wire 20L is larger than the distance Q1 and the distance Q2 described above. Specifically, the pitch P1 is a length approximately twice the distance Q1 and the distance Q2.

Figure 4:
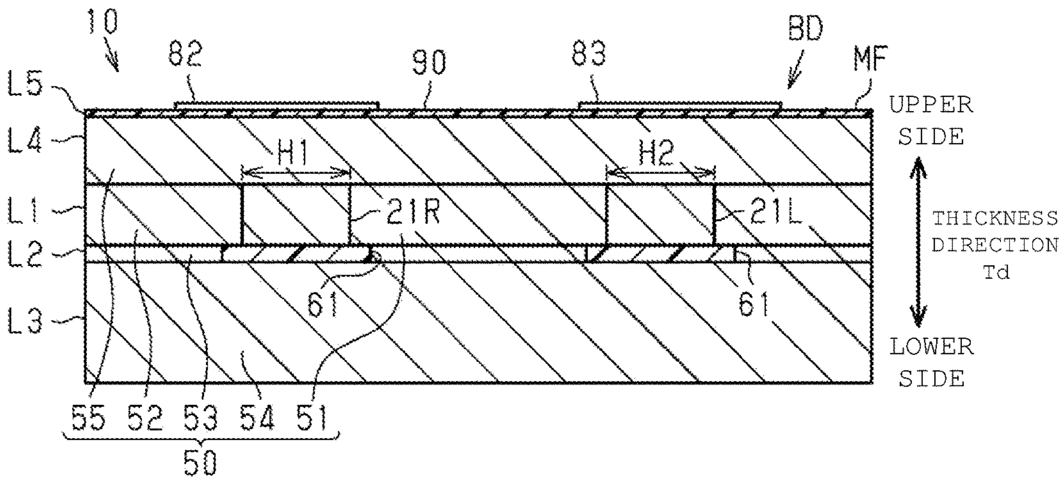
FIG. 4 is a sectional view of the inductor component taken along line 4-4 in FIG. 2.

As shown in FIG. 4, the wire width H1 in the short-side direction Wd of the first wire main body 21R is equal to the wire width H2 of the second wire main body 21L. Since the first inductor wire 20R and the second inductor wire 20L are disposed on the same first layer L1, the dimensions of the first wire main body 21R and the second wire main body 21L in the thickness direction Td are also the same. Therefore, the sectional area of the first wire main body 21R in the section orthogonal to the center axis C1 of the first wire main body 21R is equal to the sectional area of the second wire main body 21L. It should be noted that in the present application, when the displacement between the sectional areas of the first wire main body 21R and the second wire main body 21L is within 10%, the sectional areas are regarded as equal.

Figure 5:
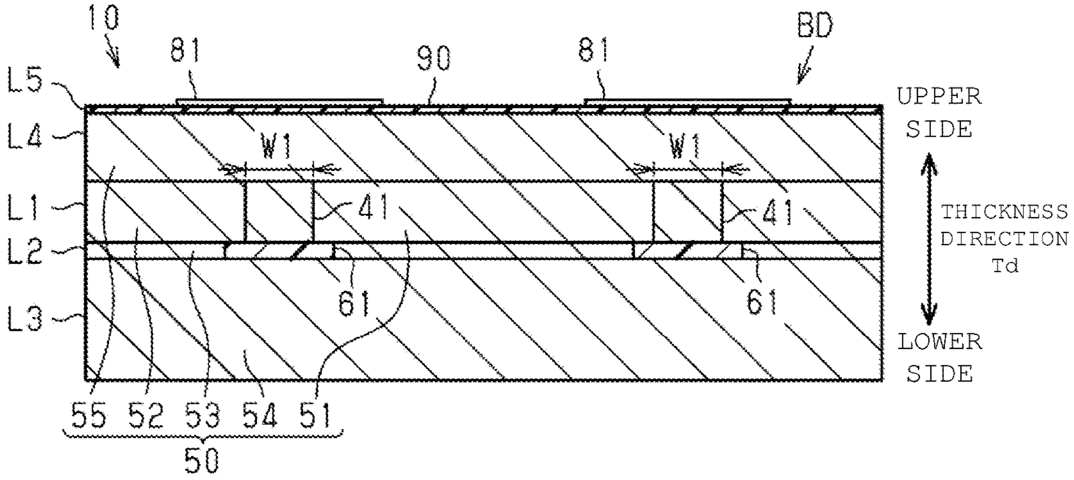
FIG. 5 is a sectional view of the inductor component taken along line 5-5 in FIG. 2.

As shown in FIGS. 4 and 5, the wire width W1 of the first support wire 41 in the short-side direction Wd is smaller than the wire width H1 of the first wire main body 21R in the short-side direction Wd. Here, the first support wire 41 and the first wire main body 21R are provided in the same first layer L1, and the dimensions in the thickness direction Td are substantially the same. Therefore, the sectional area of each of the first support wires 41 is smaller than the sectional area of the first wire main body 21R in the reflection of the difference in wire width.

Similarly, as shown in FIGS. 2 and 4, the wire width W2 of the second support wire 42 in the short-side direction Wd is smaller than the wire width H1 of the first wire main body 21R in the short-side direction Wd. Therefore, the sectional area of the second support wire 42 is smaller than the sectional area of the first wire main body 21R in the reflection of the difference in wire width.

Figure 6:
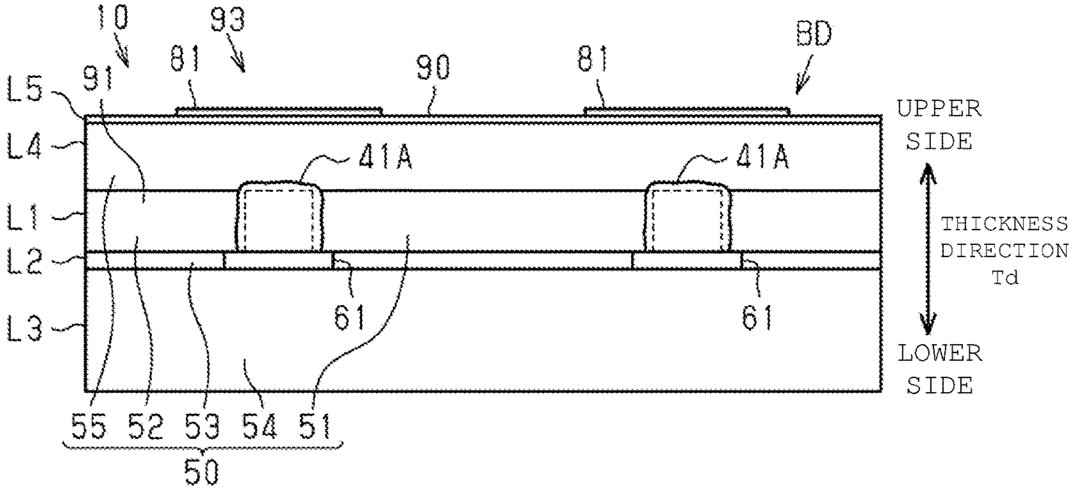
FIG. 6 is a side view showing a first side surface of the inductor component.

As shown in FIG. 6, ends of the two first support wires 41 are exposed from the first side surface 93 of the element body BD on the first end side in the long-side direction Ld. The shapes of the exposed surfaces 41A of the first support wires 41 exposed from the first side surface 93 are in a shape slightly stretching the sectional form of the first support wire 41 orthogonal to the center axis A1. As a result, the area of the exposed surface 41A of the first support wire 41 is larger than the sectional area of the first support wire 41 in the inside of the element body BD in the section orthogonal to the center axis A1. Similarly, the second support wire 42 is exposed from the second side surface 94 of the element body BD on the second end side in the long-side direction Ld. The area of the exposed surface 42A exposed from the second side surface 94 on the second support wire 42 is larger than the sectional area of the second support wire 42 in the inside of the element body BD in the section orthogonal to the center axis A2. As a result, the contact areas of the first support wire 41 and the second support wire 42 with the first side surface 93 and the second side surface 94 of the element body BD are increased, and the close contact property to each other is improved. It should be noted that the size of the sectional area only has to satisfy the relationship above, and for example, the exposed surface 41A may be in a shape in which the exposed surface 41A extends to one side and another side is covered with the extending part of the element body BD.

It should be noted that the number of the first support wires 41 exposed from the first side surface 93 is two, the number of the second support wires 42 exposed from the second side surface 94 is one, and the number of the exposed support wires is different.

Next, a manufacturing method for an inductor component 10 will be described.

Figure 7:
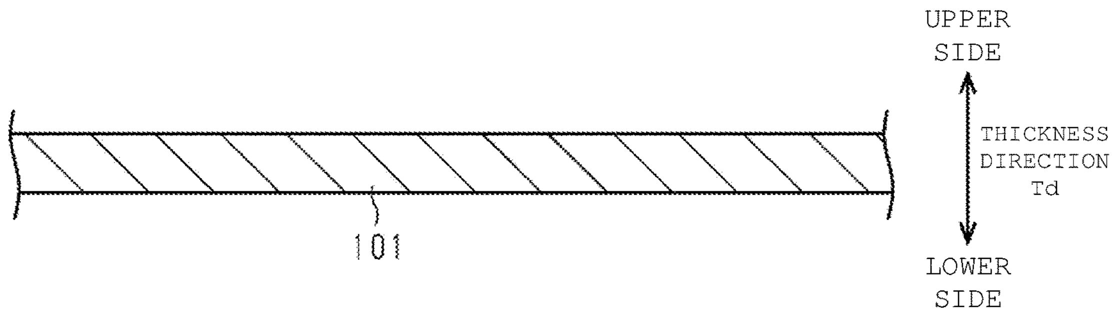
FIG. 7 is an explanatory diagram of a manufacturing method for an inductor component.

As shown in FIG. 7, first, a base member preparing step is performed. Specifically, a base member 101 in a plate shape is prepared. The base member 101 is made of ceramics. The base member 101 is in a rectangular shape when viewed from the thickness direction Td. The dimensions of edges are dimensions in which a plurality of the inductor components 10 is housed. In the following description, the description will be made as the direction orthogonal to the surface direction of the base member 101 is the thickness direction Td.

Figure 8:
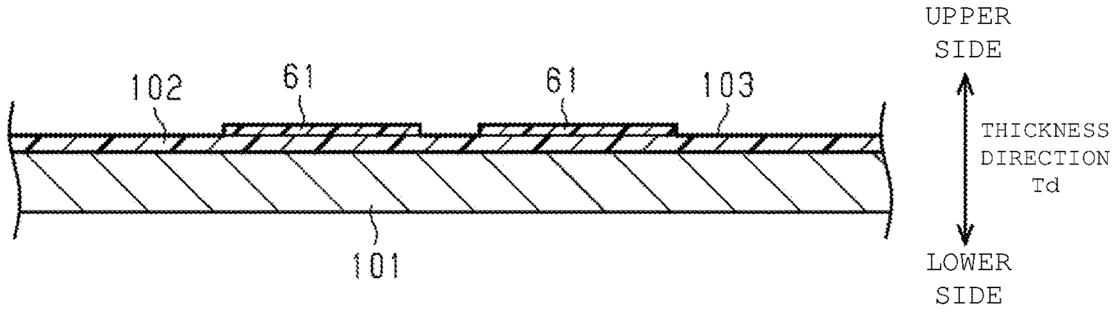
FIG. 8 is an explanatory diagram of the manufacturing method for an inductor component.

Subsequently, as shown in FIG. 8, a dummy insulating layer 102 is applied throughout the top surface of the base member 101. Subsequently, when viewed from the thickness direction Td, the insulating resin 61 is patterned by photolithography in a range slightly wider than the range in which the first inductor wire 20R and the second inductor wire 20L are disposed.

Subsequently, a seed layer forming step of forming a seed layer 103 is performed. Specifically, the seed layer 103 made of copper is formed on the top surfaces of the insulating resin 61 and the dummy insulating layer 102 by sputtering from the top surface of the base member 101 side. It should be noted that in the drawings, the seed layer 103 is depicted by thick lines.

Figure 9:
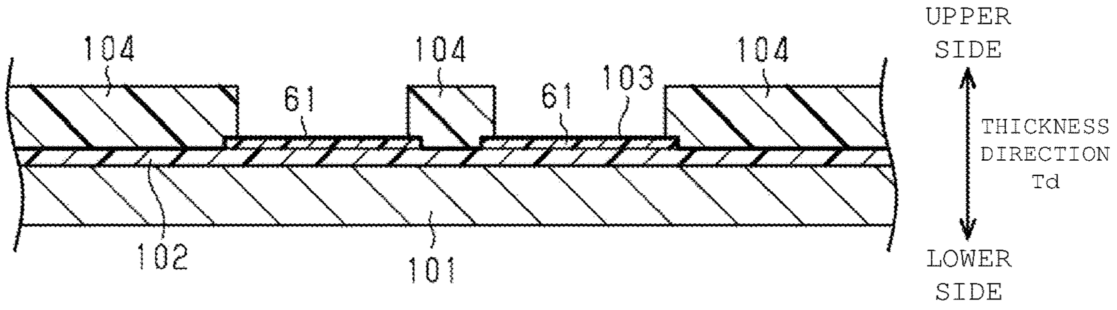
FIG. 9 is an explanatory diagram of the manufacturing method for an inductor component.

Subsequently, as shown in FIG. 9, a first covering step of forming a first covering part 104 that covers the parts of the top surface of the seed layer 103 on which the first inductor wire 20R, the second inductor wire 20L, the first support wire 41, and the second support wire 42 are not formed is performed. Specifically, first, a photosensitive dry film resist is applied to throughout the top surface of the seed layer 103. Subsequently, in all the range of the top surface of the dummy insulating layer 102 and the top surface of the insulating resin 61, the top surface of the outer edge part in the range covered with the insulating resin 61 is cured by exposure. After that, in the applied dry film resist, the parts that are not cured are removed using a chemical solution. Thus, in the applied dry film resist, the cured parts are formed as the first covering part 104. On the other hand, from the parts of the applied dry film resist, which are removed using the chemical solution without forming the cover of the first covering part 104, the seed layer 103 is exposed. The thickness of the first covering part 104, which is the dimension of the first covering part 104 in the thickness direction Td, is slightly larger than the thicknesses of the first inductor wire 20R and the second inductor wire 20L of the inductor component 10 shown in FIG. 4. It should be noted that photolithography in other steps, described later, are also similar steps, and the detailed description is omitted.

Figure 10:
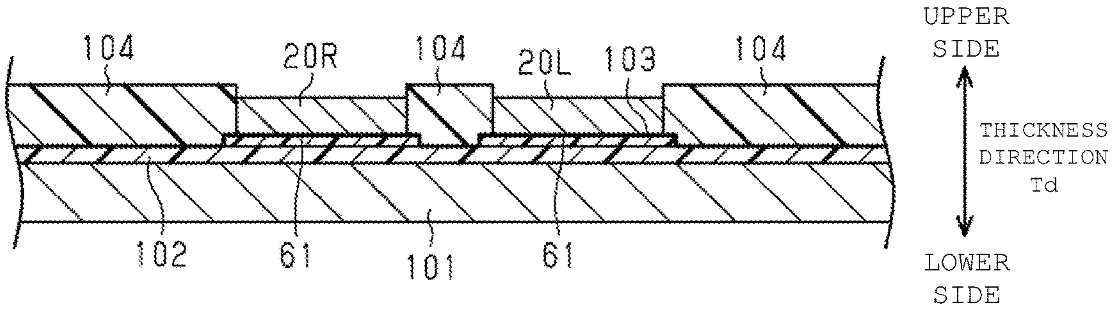
FIG. 10 is an explanatory diagram of the manufacturing method for an inductor component.

Subsequently, as shown in FIG. 10, a wire forming step of forming the first inductor wire 20R, the second inductor wire 20L, the first support wire 41, and the second support wire 42 on a portion of the top surface of the insulating resin 61 that is not covered with the first covering part 104 by electrolytic plating is performed. Specifically, on the top surface of the insulating resin 61, copper is grown from the parts from which the seed layer 103 is exposed using electrolytic copper plating. Thus, the first inductor wire 20R, the second inductor wire 20L, the first support wire 41, and the second support wire 42 are formed. Therefore, in this embodiment, the step of forming the plurality of inductor wires and the step of forming the plurality of first support wires 41 and the plurality of second support wires 42 that connect pads of different inductor wires are the same step. The first inductor wire 20R, the second inductor wire 20L, the first support wire 41, and the second support wire 42 are formed on the same plane. It should be noted that in FIG. 10, the first inductor wire 20R and the second inductor wire 20L are depicted, and the support wires are not depicted.

Figure 11:
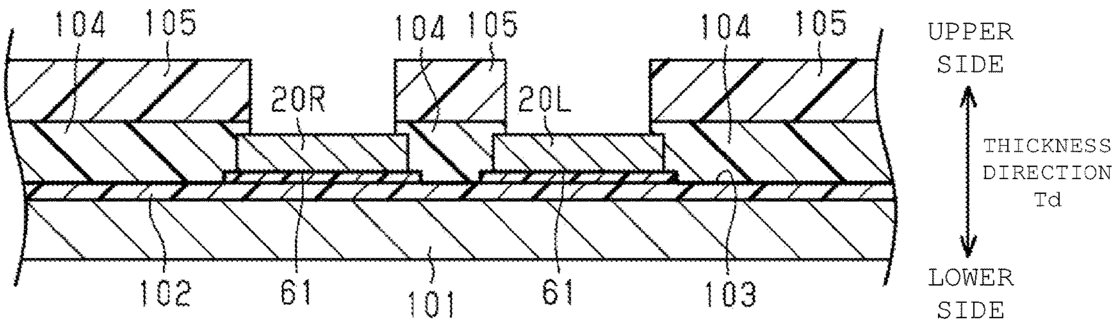
FIG. 11 is an explanatory diagram of the manufacturing method for an inductor component.

Subsequently, as shown in FIG. 11, a second covering step of forming a second covering part 105 is performed. The range in which the second covering part 105 is formed is the range in which the first vertical wire 71 and the second vertical wire 72 are not formed on all the top surface of the first covering part 104, the ranges of all the top surfaces of the support wires, and the ranges of the top surfaces of the inductor wire 20R and the second inductor wire 20L. In this range, the second covering part 105 is formed by photolithography the same as the method of forming the first covering part 104. The dimension of the second covering part 105 in the thickness direction Td is the same as the dimension of the first covering part 104.

Subsequently, a vertical wire forming step of forming the vertical wires is performed. Specifically, in the first inductor wire 20R and the second inductor wire 20L, the first vertical wire 71 and the second vertical wire 72 are formed by electrolytic copper plating on the parts that are not covered with the second covering part 105. In the vertical wire forming step, the setting is made such that the top end of growing copper is located slightly lower from the top surface of the second covering part 105. Specifically, the setting is made such that the dimensions of the vertical wires in the thickness direction Td before cut, described later, are the same as the dimensions of the inductor wires in the thickness direction Td.

Figure 12:
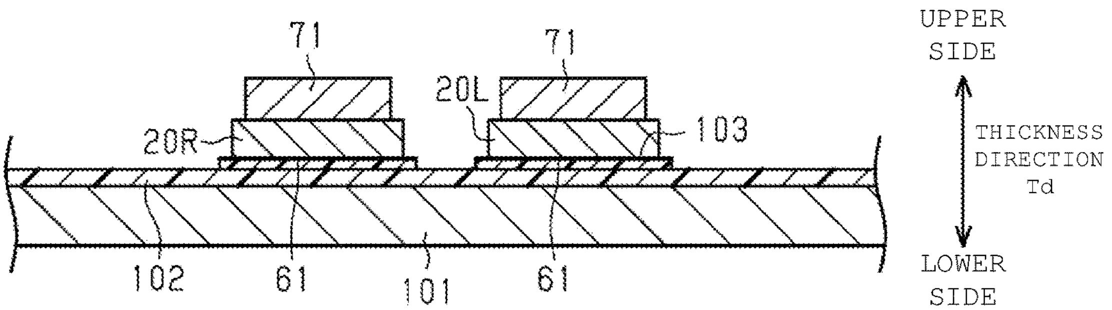
FIG. 12 is an explanatory diagram of the manufacturing method for an inductor component.

Subsequently, as shown in FIG. 12, a covering part removing step of removing the first covering part 104 and the second covering part 105 is performed. Specifically, the first covering part 104 and the second covering part 105 are wet-etched with a chemical, and the first covering part 104 and the second covering part 105 are peeled. It should be noted that in FIG. 12, the first vertical wires 71 are depicted, and the second vertical wires 72 are not depicted.

Subsequently, a seed layer etching step of etching the seed layer 103 is performed. The seed layer 103 is etched, and the exposed seed layer 103 is removed. As described above, the inductor wires and the support wires are formed by semi-additive process (SAP).

Figure 13:
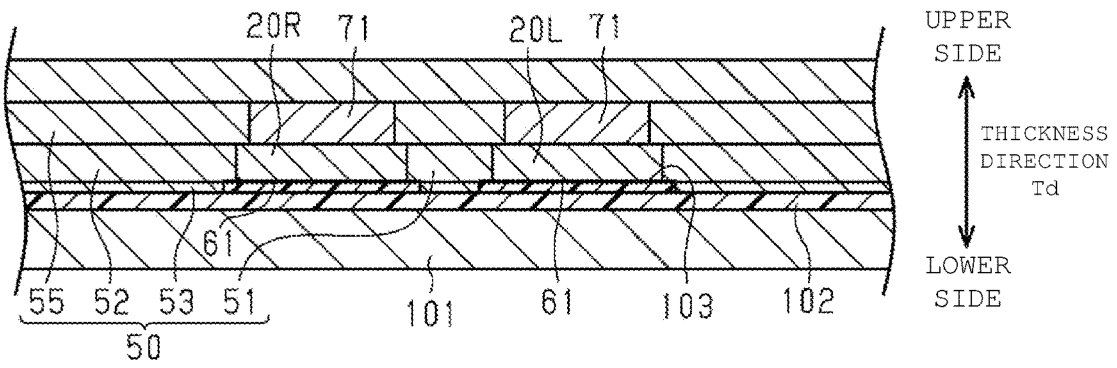
FIG. 13 is an explanatory diagram of the manufacturing method for an inductor component.

Subsequently, as shown in FIG. 13, a second magnetic layer forming step of stacking the inner magnetic path 51, the outer magnetic path 52, the insulating resin magnetic layer 53, and the second magnetic layer 55 is performed. Specifically, first, a resin containing magnetic powder that is the material of the magnetic layer 50 is applied to the top surface of the base member 101 side. At this time, the resin containing the magnetic powder is applied such that the top surfaces of the vertical wires are also covered. Subsequently, the resin containing the magnetic powder is compressed by press working, and the inner magnetic path 51, the outer magnetic path 52, the insulating resin magnetic layer 53, and the second magnetic layer 55 are formed on the top surface of the base member 101 side.

Figure 14:
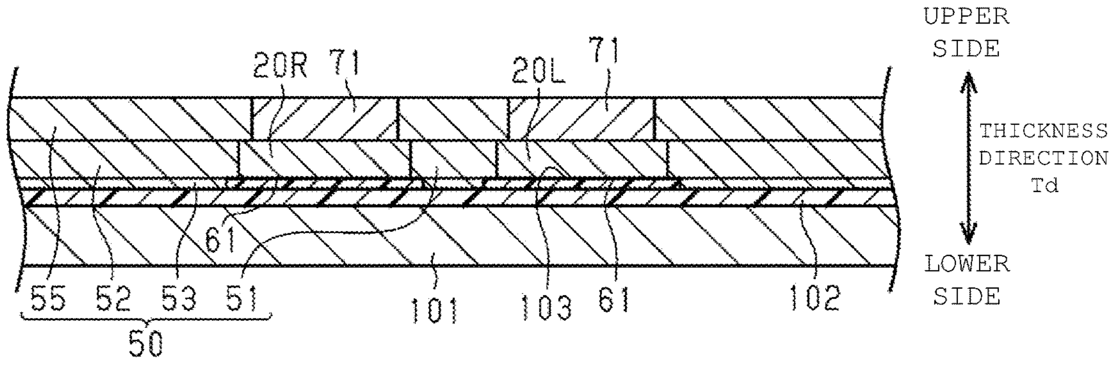
FIG. 14 is an explanatory diagram of the manufacturing method for an inductor component.

Subsequently, as shown in FIG. 14, the upper part of the second magnetic layer 55 is cut until the top surfaces of the vertical wires is exposed. It should be noted that although the inner magnetic path 51, the outer magnetic path 52, the insulating resin magnetic layer 53, and the second magnetic layer 55 are integrally formed, in the drawings, the inner magnetic path 51, the outer magnetic path 52, the insulating resin magnetic layer 53, and the second magnetic layer 55 are separately depicted.

Figure 15:
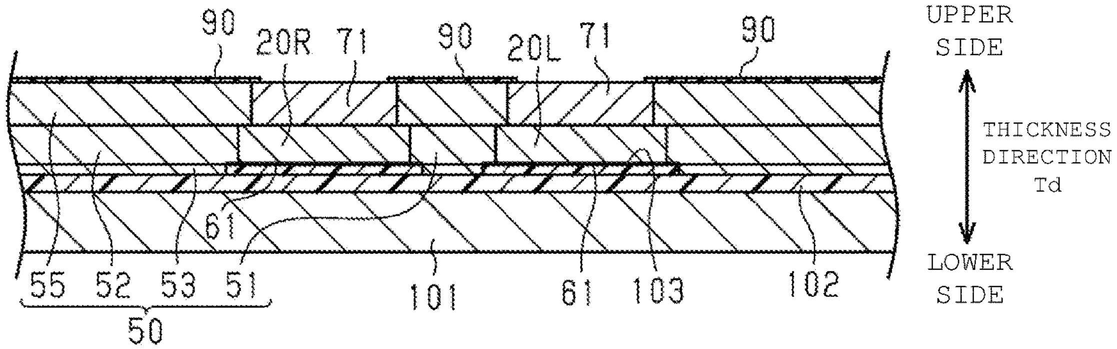
FIG. 15 is an explanatory diagram of the manufacturing method for an inductor component.

Subsequently, as shown in FIG. 15, an insulating layer forming step is performed. Specifically, on the parts on which the terminal portion 80 is not formed on the top surface of the second magnetic layer 55 and the top surfaces of the vertical wires, a solder resist that functions as the insulating layer 90 is patterned by photolithography. In the present embodiment, the top surface of the insulating layer 90, i.e., the direction orthogonal to the principal surface MF of the element body BD is the thickness direction Td.

Figure 16:
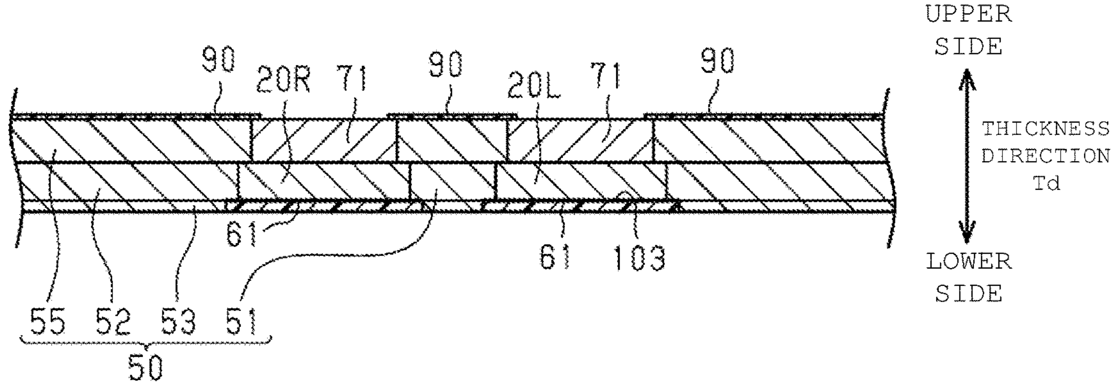
FIG. 16 is an explanatory diagram of the manufacturing method for an inductor component.

Subsequently, as shown in FIG. 16, a base member cutting step is performed. Specifically, the base member 101 and the dummy insulating layer 102 are all removed by cutting. It should be noted that as the result of cutting all the dummy insulating layer 102, although the lower parts of the insulating resins are locally cut, the inductor wires are not removed.

Figure 17:
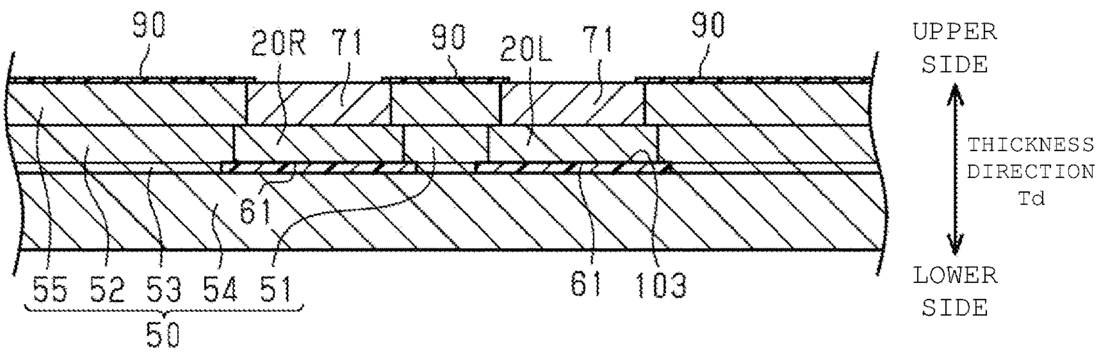
FIG. 17 is an explanatory diagram of the manufacturing method for an inductor component.

Subsequently, as shown in FIG. 17, a first magnetic layer forming step of stacking the first magnetic layer 54 is performed. Specifically, first, a resin containing magnetic powder that is the material of the first magnetic layer 54 is applied to the under surface of the base member 101. Subsequently, the resin containing the magnetic powder is compressed by press working, and the first magnetic layer 54 is formed on the under surface of the base member 101.

Subsequently, the lower end part of the first magnetic layer 54 is cut. For example, the lower end part of the first magnetic layer 54 is cut such that the dimensions from the top surfaces of the external terminals to the under surface of the first magnetic layer 54 have desired values.

Figure 18:
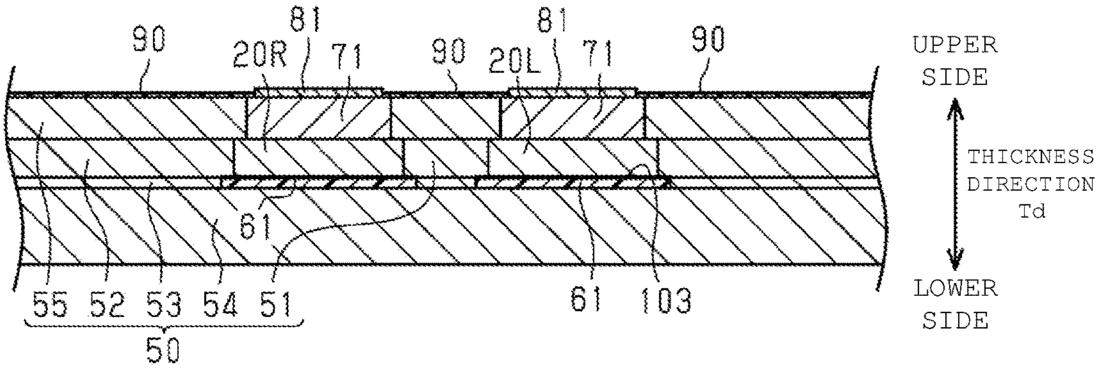
FIG. 18 is an explanatory diagram of the manufacturing method for an inductor component.

Subsequently, as shown in FIG. 18, a terminal portion forming step is performed. Specifically, in the top surface of the second magnetic layer 55, the top surfaces of the vertical wires 71 and 72, the first external terminal 81, the second external terminal 82, and the dummy portion 83 are formed on the parts that are not covered with the insulating layer 90. In these metal layers, copper, nickel, and gold are formed by electroless plating. Between copper and nickel, a catalyst layer such as palladium may be provided. Thus, the first external terminal 81, the second external terminal 82, and the dummy portion 83 in the three-layer structure are formed. In FIG. 18, the first external terminal 81 is depicted, and the second external terminal 82 and the dummy portion 83 are not depicted.

Figure 19:
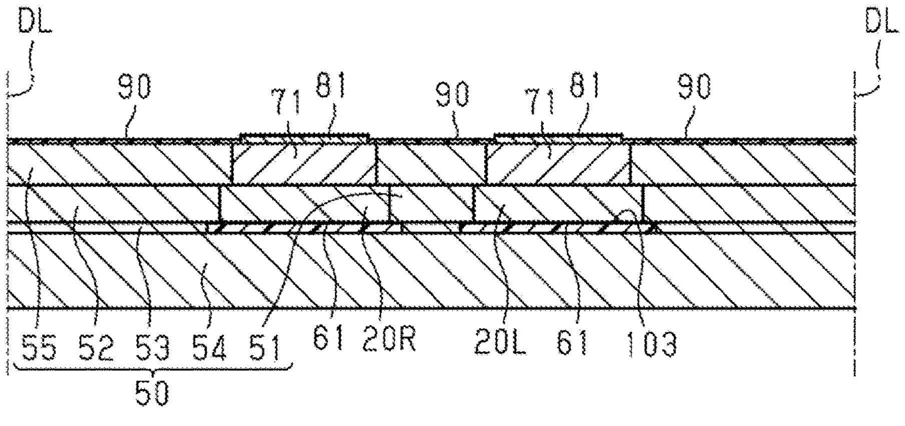
FIG. 19 is an explanatory diagram of the manufacturing method for an inductor component.

Subsequently, as shown in FIG. 19, a dicing step is performed. Specifically, die separation is performed by cutting with a dicing machine at break lines DL. As a result, the inductor component 10 can be obtained.

Figure 20:
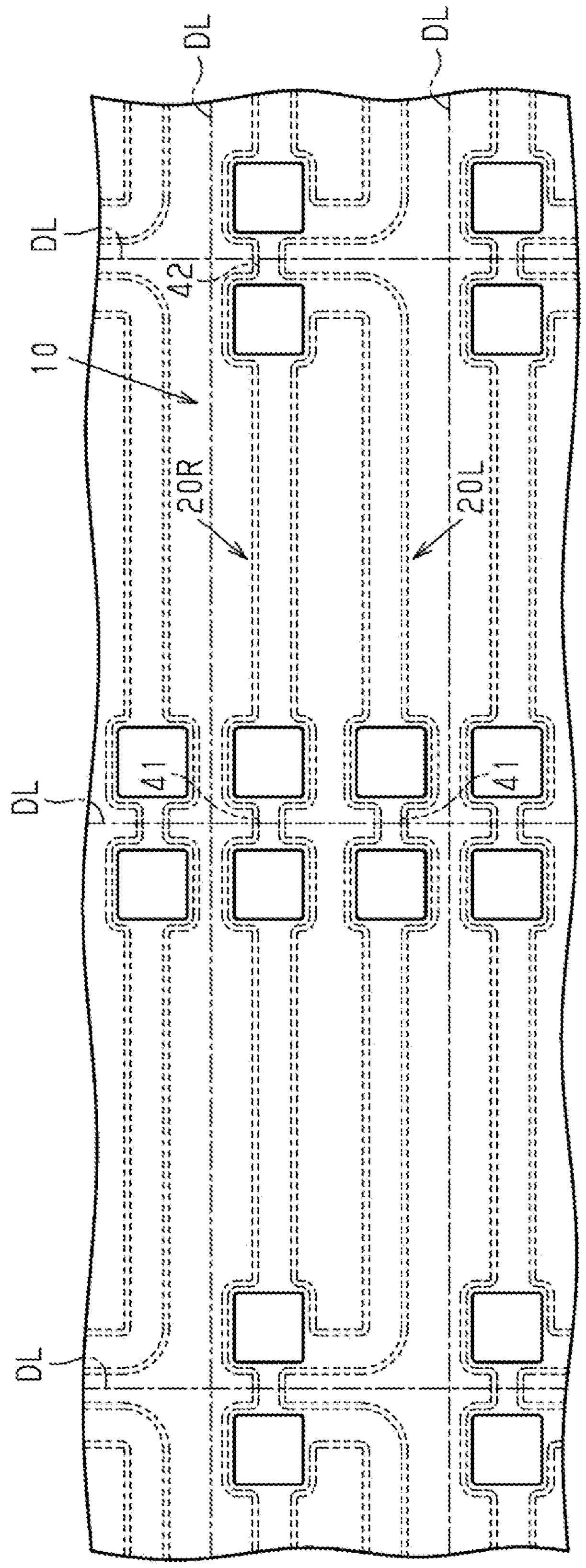
FIG. 20 is an explanatory diagram of the manufacturing method for an inductor component.

In the state before cutting with a dicing machine, for example, as shown in FIG. 20, a plurality of inductor components is arranged side by side in the long-side direction Ld and the short-side direction Wd, and the individual inductor components are connected with the element body BD, the first support wire 41, and the second support wire 42. Specifically, the first support wire 41 is connected to each other, and the second support wire 42 is connected to each other. The first support wires 41 and the second support wires 42 included on the break lines DL are cut in the thickness direction Td, and the section of the first support wire 41 is exposed as the exposed surface 41A from the first side surface 93. The section of the second support wire 42 is exposed as the exposed surface 42A to the second side surface 94.

It should be noted that after the dicing step, the inductor components 10 are stood for a certain period under the presence of oxygen. Thus, the parts including the exposed surface 41A of the first support wire 41 and the parts including the exposed surface 42A of the second support wire 42 are oxidized to form Cu oxides.

Next, the operation of the present embodiment will be described.

When an electric current is supplied to any of the external terminals 81 and 82 of the inductor component 10, the electric current is flowed from the external terminals 81 and 82 to the vertical wire connected to the external terminals 81 and 82 and the inductor wire in this order. At this time, the inductance value that can be acquired varies depending on the path length of the inductor wire through which the electric current is flowed.

For example, it is assumed that an electric current is supplied using the external terminal on the current input side as the first external terminal 81 connected to the first pad 22R of the first inductor wire 20R and the external terminal on the current output side as the second external terminal 82 connected to the second pad 23R of the first inductor wire 20R. The state in which an electric current is supplied as described above is referred to as a first state. In the first state, the path length of the inductor wire through which the electric current is flowed corresponds to the wire length of the first inductor wire 20R. As described above, the inductance value of the first inductor wire 20R can be approximately 2.5 nH.

It is assumed that an electric current is supplied using the external terminal on the current input side as the first external terminal 81 connected to the first pad 22L of the second inductor wire 20L and the external terminal on the current output side as the second external terminal 82 connected to the second pad 23R of the first inductor wire 20R. The state in which an electric current is supplied as described above is referred to as a second state. In the second state, the path length of the inductor wire through which the electric current is flowed corresponds to the wire length of the second inductor wire 20L. That is, since the wire length through which the electric current is flowed is longer than that in the first state, the inductance value that can be acquired in the second state is larger than the inductance value in the first state. Specifically, the inductance value in the second state is 1.1 times or more the inductance value in the first state, and can be approximately 3.1 nH in the present embodiment.

It is assumed that an electric current is supplied using the external terminal on the current input side as the first external terminal 81 connected to the first pad 22R of the first inductor wire 20R and the external terminal on the current output side as the first external terminal 81 connected to the first pad 22L of the second inductor wire 20L. The state in which an electric current is supplied as described above is referred to as a third state. In the third state, the path length of the inductor wire through which the electric current is flowed is a length obtained by adding the wire length of the first wire main body 21R, the wire length of the second wire main body 21L, and the wire length of the first pad 22L. That is, in the third state, the wire length through which the electric current is flowed is longer than that in the first state and the second state. Therefore, the inductance value that can be acquired in the third state is larger than the inductance values in the first state and the second state. The inductance value in the third state can be approximately 4.9 nH in the present embodiment.

Next, the effects of the present embodiment will be described.

(1) In the embodiment, the first inductor wire 20R and the second inductor wire 20L are formed on the same plane in the element body BD. Therefore, disposing the inductor wires 20R and 20L at different positions in the thickness direction Td can contribute to a reduction in the thickness of the inductor component 10 in the thickness direction Td. As the number of the first inductor wires 20R and the second inductor wires 20L to be stacked is smaller, the influence due to the positions of the first wire main body 21R and the second wire main body 21L and the positions of the first support wire 41 and the second support wire 42 is larger, and thus the configuration of the present application is much more effective.

In the embodiment, the inductance values of the first state, the second state, and the third state can be acquired in one inductor component 10. Different inductance values can be acquired depending on the usage condition of the inductor component 10.

It should be noted that in the embodiment, the number of turns of the first wire main body 21R of the first inductor wire 20R is zero turns, and the number of turns of the second wire main body 21L of the second inductor wire 20L is 0.25 turns. Since the number of turns of the inductor wire is small and routing of the wire is small, direct current resistances in the wires are reduced, and the acquisition efficiency of inductance is easily ensured.

(2) The inductance value of the first inductor wire 20R is approximately 2.5 nH, and the inductance value of the second inductor wire 20L is approximately 3.1 nH. In order to suppress the ripple current in the converter that performs the high-frequency switching operation, the inductance value of the inductor wire is preferably 1 nH or more. When the inductance value of the inductor wires is 10 nH or more, the followability of the voltage fluctuation obtained in the high-frequency switching operation is degraded. Therefore, the inductance value of the inductor wires is preferably 1 nH or more and 10 nH or less (i.e., from 1 nH to 10 nH), and the inductance value of the inductor wire in the present embodiment is within the above range.

(3) In the embodiment, the second pad 23R in the first inductor wire 20R is the same pad as the second pad 23R in the second inductor wire 20L. In the inductor component 10 of the embodiment, the volume of the magnetic layer 50 is larger by one pad and one vertical wire than an inductor component in which the inductor wires have two different pads. Since the volume of the magnetic layer 50 is large, the acquisition efficiency of inductance is easily improved. The second inductor wire 20L is connected to the second pad 23R of the first inductor wire 20R, as described above, and thus the first wire main body 21R and the second wire main body 21L can function as inductors whose wire lengths are the overall wire lengths.

(4) In the embodiment, the first pad 22L and the second pad 23R of the second inductor wire 20L are disposed at positions in symmetry to the geometric center G of the element body BD. Therefore, it is easy to design the distance from the first pad 22L to the second pad 23R to be long in the element body BD. That is, it is easy to design the wire length of the second wire main body 21L to be long. An increase in the wire length of the second wire main body 21L easily provides a difference in the wire length from the first wire main body 21R, and the difference in the inductance value easily increases between the first state and the second state described above.

(5) In the embodiment, the mean value of the pitch X1, the first distance Y1, and the second distance Y2 is "200 micrometers". The ratio of the pitch X1 to the mean value is "125%". The ratio of the first distance Y1 and the second distance Y2 to the mean value is "87.5%".

When the ratio is unbalanced, the arrangement of the inductor wires in the element body BD is unbalanced. When the arrangement of the inductor wire is unbalanced in the element body BD, the weight balance of the element body BD is also unbalanced, and the inductor component may be inclined and mounted on the substrate. Therefore, preferably, the inductor wires are disposed in the element body BD in a roughly unbalanced state. Specifically, the ratio is preferably 50% or more and 150% or less (i.e., from 50% to 150%), and in the present embodiment, the values of the ratio fall within the range, which is a preferable state.

(6) In the embodiment, the pitch X1 is longer than the first distance Y1 and the second distance Y2. When the pitch X1 is longer than the first distance Y1 and the second distance Y2, the length of the short linear portion 32 of the second wire main body 21L tends to be longer, and the wire length of the second inductor wire 20L is easily designed to be longer.

(7) In the embodiment, the wire widths of the first wire main body 21R and the second wire main body 21L are equal to each other. Since the first wire main body 21R and the second wire main body 21L also have the same dimension in the thickness direction Td, the first wire main body 21R and the second wire main body 21L have the same sectional area. Since the two inductor wires have the same sectional area, it is easy to form the inductor wires in the same process. That is, it is possible to suppress an increase in the number of processes and complication in the manufacture of the inductor component 10.

(8) In the embodiment, the gap between the wire main bodies in the adjacent parallel portions is 200 micrometers. From the viewpoint of suppressing the disturbance of the magnetic flux between the inductor wires, the minimum gap is preferably 50 micrometers or more, and more preferably approximately 100 micrometers or more.

(9) In the embodiment, the dimension of the element body BD in the thickness direction Td is approximately 0.2 mm. The smaller the dimension of the element body BD in the thickness direction Td becomes, the smaller the dimension protruding from the substrate in mounting the inductor component 10 on the substrate becomes. Therefore, the inductor component 10 according to the embodiment is also mountable on a site at which the inductor component 10 in a large size in the thickness direction Td has not be mountable.

(10) In the embodiment, the areas of the first pads 22R and 22L are larger than the area of the first vertical wire 71 at the connection point to the first pads 22R and 22L. Therefore, supposing that the position of the first vertical wire 71 is displaced due to a manufacturing error, the overall contact surface of the first vertical wire 71 with the first pads 22R, 22L is easily brought into contact with the first pad 22R, 22L. At this point, the same applies to the second vertical wire 72.

(11) In the embodiment, the first magnetic layer 54 and the second magnetic layer 55 are organic resins containing metal magnetic powder. The mean particle size of the metal magnetic powder is approximately five micrometers. With the use of the magnetic powder having a small particle size of 10 micrometers or less in this manner, it is possible to reduce the iron loss while ensuring the relative permeability of the first magnetic layer 54 and the second magnetic layer 55.

(12) In the embodiment, the first inductor wire 20R, the second inductor wire 20L, the first support wire 41, and the second support wire 42 are present in the first layer L1. In the state in which the plurality of inductor components 10 is arranged side by side, i.e., in the state before cutting with a dicing machine, a configuration can be adopted in which the plurality of inductor wires is connected using the first support wire 41 and the second support wire 42. When the plurality of first inductor wires 20R and the plurality of second inductor wires 20L are connected using the first support wire 41 and the second support wire 42, these inductor wires can be supported and positioned with no necessity of an insulating substrate or the like for supporting the inductor wires. Therefore, it is possible to contribute to a reduction in the thickness of the inductor component 10 in that an insulating substrate or the like for supporting the inductor wire is unnecessary.

(13) In the embodiment, the pitch P1 is approximately twice the distance Q1 and the distance Q2. In the embodiment, as shown in FIG. 20, before the inductor component 10 is formed, a plurality of inductor components is arranged side by side in the long-side direction Ld and the short-side direction Wd, and the individual inductor components are connected with the element body BD and the support wires 41 and 42. Here, in the state in which the inductor components are connected to each other, the pitches in the short-side direction Wd between the adjacent first support wires 41 are all the pitch P1. According to the relationship between the distances Q1 and Q2 and the pitch P1 as described above, the first support wires 41 are disposed at equal gaps with respect to the length of the overall mother board along the short-side direction Wd of the inductor components. When the mother substrate is cut along the break line DL, the first support wires 41 are disposed at equal gaps, and thus a load at the time of cutting is easily uniformly distributed. Since the load is uniformly distributed, the deformation of the inductor component 10 caused at the time of cutting can be suppressed.

(14) In the embodiment, the exposed surface 41A of the first support wire 41 is made of a Cu oxide in the present embodiment. Since the exposed surface 41A is made of a Cu oxide, the conductivity is reduced on the exposed surface 41A. Therefore, supposing that another electric component is brought into contact with the exposed surface 41A, it is possible to suppress an electric current being carried through the exposed surface 41A. At this point, the same applies to the second support wire 42.

(15) In the embodiment, the first support wire 41 and the second support wire 42 are in close contact with the magnetic layer 50. Since the magnetic layer 50 is in close contact with the first support wire 41 and the second support wire 42, the volume of the magnetic layer 50 can be ensured, and the acquisition efficiency of the inductance of the inductor component 10 is easily ensured.

(16) In the embodiment, the dummy portion 83 is provided in the fifth layer L5. In mounting the inductor component 10 on a substrate or the like, the terminal portion 80 and the substrate may be soldered and mounted. Therefore, since the dummy portion 83 is provided, the inductor component 10 and the substrate can be fixed at four places, and the inductor component 10 is less likely to come off from the substrate.

(17) In the embodiment, when viewed from the thickness direction Td, the area of the dummy portion 83 is equal to that of the first external terminal 81 and the second external terminal 82. Therefore, when the dummy portion 83 is soldered to the substrate or the like in the same manner as the first external terminal 81 and the second external terminal 82, the amount of solder applied to these four terminal portions 80 can be made uniform. Therefore, it is possible to suppress mounting the inductor component 10 on a substrate or the like in an inclined from.

(18) In the embodiment, the shape of the dummy portion 83 is different from the shapes of the first external terminal 81 and the second external terminal 82 when viewed from the thickness direction Td. In the present embodiment, since the number of dummy portions 83 provided in the inductor component 10 is one, the dummy portions 83 are asymmetrically provided on the principal surface MF of the inductor component 10. Therefore, the orientation of the inductor component 10 can be easily specified by the dummy portion 83. When the orientation of the inductor component 10 can be determined, for example, it is easy to correctly install the inductor component 10 when the inductor component is mounted on a substrate.

The embodiment can be modified and carried out as follows. The embodiment and exemplary modifications below can be implemented in combination within a range that is not technically contradictory.

Three or more inductor wires may be provided in the inside of element body BD.

Figure 21:
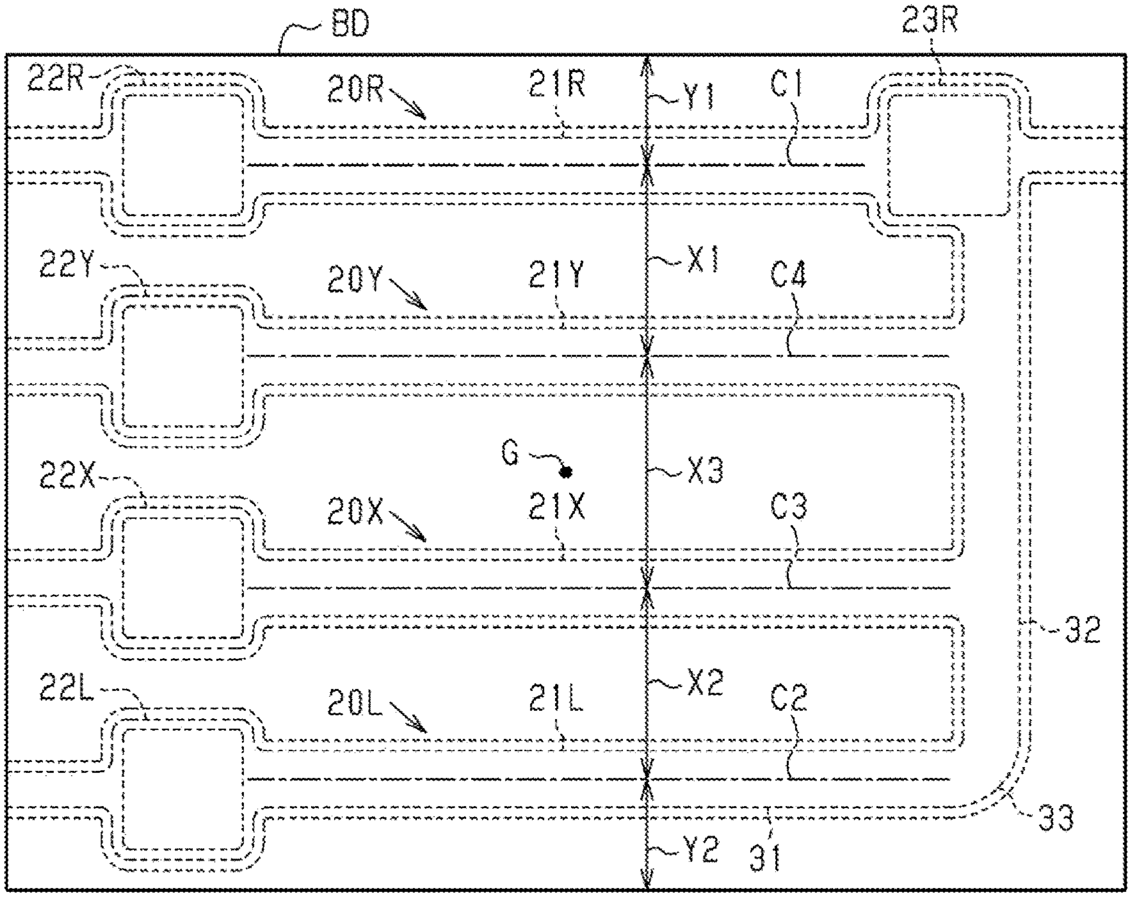
FIG. 21 is a transparent top view of an inductor component according to an exemplary modification.

In an example shown in FIG. 21, a third inductor wire 20X and a fourth inductor wire 20Y are provided in addition to the first inductor wire 20R and the second inductor wire 20L. The third wire main body 21X of the third inductor wire 20X extends in parallel with the first wire main body 21R of the first inductor wire 20R. The third wire main body 21X is disposed between the first wire main body 21R and the long linear portion 31 of the second wire main body 21L. The first end of the third wire main body 21X is connected to the short linear portion 32 of the second wire main body 21L. That is, the third inductor wire 20X shares a part of the wire with the second inductor wire 20L. To the second end of the third wire main body 21X, a first pad 22X is connected.

The fourth wire main body 21Y of the fourth inductor wire 20Y extends in parallel with the first wire main body 21R of the first inductor wire 20R. The fourth wire main body 21Y is disposed between the first wire main body 21R and the third wire main body 21X. The first end of the fourth wire main body 21Y is connected to the short linear portion 32 of the second wire main body 21L. That is, the fourth inductor wire 20Y shares a part of the wire with the second inductor wire 20L. A first pad 22Y is connected to the second end of the fourth wire main body 21Y.

It should be noted that the first wire main body 21R of the first inductor wire 20R extends in parallel with one side of the outer edge of the element body BD. The second pad 23R of the first inductor wire 20R and the second pad 23R of the second inductor wire 20L are the same pad. The first pad 22L and the second pad 23R of the second inductor wire 20L are disposed at symmetrical positions across the geometric center G. That is, the first inductor wire 20R and the second inductor wire 20L are disposed along three sides of the rectangular shape of the element body BD and extend in a wide range of the element body BD. Therefore, it is easy to ensure a large acquisition range of the inductance of the inductor component.

In the example shown in FIG. 21, the third wire main body 21X of the third inductor wire 20X and the fourth wire main body 21Y of the fourth inductor wire 20Y are parallel portions extending in parallel with the first wire main body 21R. A distance from the center axis C1 of the first wire main body 21R to the center axis C4 of the fourth wire main body 21Y in the parallel portion in a direction orthogonal to the direction of extending the parallel portion is defined as a pitch X1. A distance from the center axis C2 of the second wire main body 21L to the center axis C3 of the third wire main body 21X in the parallel portion in a direction orthogonal to the direction of extending the parallel portion is defined as a pitch X2. A distance from the center axis C3 of the third wire main body 21X to the center axis C4 of the fourth wire main body 21Y in a direction orthogonal to the direction of extending the parallel portion is defined as a pitch X3. At this time, the pitch X1 and the pitch X2 are equal, and the pitch X3 is larger than the pitches X1 and X2.

As in this modification, adjacent parallel portions may be disposed at different pitches. That is, the wire main bodies do not necessarily have to be disposed at equal gaps. In the case in which the pitch between the wire main bodies of the inductor wire is different, the sizes of the inductance values acquired from the inductor wires are easily varied, and designs are easily provided to obtain inductance values suitable for the use conditions of the inductor component 10.

In the case in which three or more inductor wires are present and these inductor wires have parallel portions extending in parallel with each other, when a large difference is produced in each pitch, the inductor wires are unevenly disposed in the element body. Therefore, the arrangement of the external terminals is unbalanced, or the weight balance of the inductor component is unbalanced. Therefore, the ratio of each pitch to the mean value of each pitch in the short-side direction Wd of the adjacent parallel portions is preferably 85% or more and 115% or less (i.e., from 85% to 115%).

In the example shown in FIG. 21, the pitch X1 can be "250 micrometers", the pitch X2 can be "250 micrometers", and the pitch X3 can be "310 micrometers". The mean value of the pitch is thus approximately "270 micrometers". The ratio of each pitch to the mean value of the pitches is approximately "93%" for the pitch X1, approximately "93%" for the pitch X2, and approximately "115%" for the pitch X3. Therefore, in the example shown in FIG. 21, the ratio of each pitch to the mean value of the pitches is 85% or more and 115% or less (i.e., from 85% to 115%) for all the pitches.

In the example shown in FIG. 21, the ratio of each pitch to the mean value of the pitches may also be less than 85% or may be greater than 115%.

Figure 22:
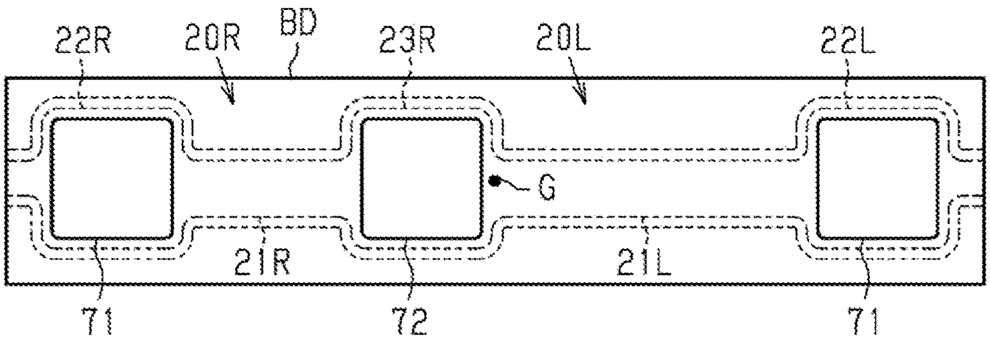
FIG. 22 is a transparent top view of an inductor component according to an exemplary modification.

In an example shown in FIG. 22, the second wire main body 21L of the second inductor wire 20L extends linearly. The second wire main body 21L of the second inductor wire 20L has a first end connected to the second pad 23R of the first inductor wire 20R, and a second end connected to the first pad 22L. The first pad 22R, the second pad 23R, and the first pad 22L are provided in the direction of extending the first wire main body 21R and the second wire main body 21L. That is, the second wire main body 21L extends in the same direction as the first wire main body 21R from the second pad 23R on the opposite side of the first wire main body 21R. The wire length of the second wire main body 21L is 1.2 times the wire length of the first wire main body 21R.

As in the example shown in FIG. 22, the two pads of the second inductor wire 20L do not necessarily have to be disposed at positions in symmetry to the geometric center G of the element body BD. In the case in which the first inductor wire 20R and the second inductor wire 20L are disposed in a line and the pads are also disposed in a line as shown in FIG. 22, the inductor component is long in one direction. The positions of the pads in the examples of the foregoing embodiment may be changed such that the inductor component has a shape suitable for mounting.

In the embodiment, the shape of the element body BD when viewed from the thickness direction Td is not limited to the examples of the embodiment. For example, the shape may be a square shape or a circular shape.

In the embodiment, the center axis A1 of the first support wire 41 and the center axis A2 of the second support wire 42 do not necessarily have to be located on the same straight line. The arrangement of the support wires 41 and 42 can be appropriately changed suitable for the shapes and the like of the first pads 22R and 22L and the second pad 23R.

The shapes of the wire main bodies 21R and 21L in the first inductor wire 20R and the second inductor wire 20L are not limited to the linearly extending shapes as long as the number of turns is 0.5 turns or less. For example, the wire main bodies 21R and 21L may have a wave shape or a meander shape. It should be noted that in the case in which the wire main bodies 21R and 21L have a meander shape, the pitch between the parts extending linearly from the first pads 22R and 22L in the two different wire main bodies 21R and 21L is the pitch of the first inductor wire 20R and the second inductor wire 20L.

In the embodiment, the connection portion 33 does not necessarily have to be curved in an arc shape with respect to the second inductor wire 20L. For example, a configuration may be provided in which the long linear portion 31 is directly connected to the short linear portion 32, and the second wire main body 21L is connected in a shape bent at a right angle.

The area of the exposed surface 41A of the first support wire 41 may become equal to the sectional area of the first support wire 41 in the inside of element body BD by a method of cutting with a dicing machine or a process after cutting with a dicing machine. For example, when the first side surface 91 including the exposed surface 41A is polished after cutting with a dicing machine, the shape of the exposed surface 41A becomes the same as the sectional shape of the first support wire 41 in the inside of element body BD, and thus, the sectional areas of both become the same. At this point, the same applies to the second support wire 42.

In the embodiment, the first wire main body 21R and the second wire main body 21L may have different sectional areas, and the first wire main body 21R and the second wire main body 21L may have different dimensions in the wire width and in the thickness direction Td. As long as the first wire main body 21R and the second wire main body 21L have different sectional areas, the inductance values may be different on the occasion in which their wire lengths are the same.

In the embodiment, the inductance values of the first wire main body 21R and the second wire main body 21L are not limited to the examples of the embodiment. For example, a configuration may be provided in which the wire lengths of the first wire main body 21R and the second wire main body 21L are made longer, and the inductance values are larger than 10 nH. The inductance values of the inductor wires 20R and 20L may be smaller than 1 nH.

In the embodiment, the position of the first support wire 41 is not limited to the examples of the embodiment. For example, the position of the center axis A1 of the first support wire 41 in the short-side direction Wd may be the same as the position of the center axis of the connected wire main body in the short-side direction Wd. It should be noted that in the case in which the wire main body has a connected part, the center axis A1 of the first support wire 41 may be shifted from the center axis of the linear portion as long as the pad-side end of the wire main body is in a linear shape.

In the embodiment, the number of support wires exposed from the first side surface 91 and the second side surface 92 may be three or more or all may be omitted corresponding to the number of inductor wires.

In the embodiment, the mean particle size of the metal magnetic powder contained in the magnetic layer 50 is not limited to the examples of the embodiment. However, in order to ensure the relative permeability, the mean particle size of the metal magnetic powder is preferably one micrometer or more and ten micrometers or less (i.e., from one micrometer to ten micrometers).

In the embodiment, the metal magnetic powder included in the first magnetic layer 54 and the second magnetic layer 55 do not necessarily have to be the metal magnetic powder containing Fe. For example, the magnetic powder may be metal magnetic powder containing FeNi or a metal magnetic powder containing FeSiCr.

In the embodiment, the gap between the parallel portions is preferably 50 micrometers or more from the viewpoint of suppressing the disturbance of the magnetic flux produced between the wires. In the case in which the thickness is less than 50 micrometers, preferably, an insulating resin or an insulating inorganic substance is disposed between the inductor wires from the viewpoint above.

In the embodiment, the pitch X1, the first distance Y1, and the second distance Y2 may be equal, or the first distance Y1 and the second distance Y2 may be larger than the pitch X1. The first distance Y1 and the second distance Y2 may be different from each other.

In the embodiment, the ratios of the pitches, the first distance Y1, and the second distance to the mean value of the pitches, the first distance Y1, and the second distance Y2 may also be less than 50% or may be more than 150%.

In the embodiment, the material of a part including the exposed surface 41A of the first support wire 41 and the material of a part including the exposed surface 42A of the second support wire 42 do not necessarily have to be a Cu oxide. In the case in which a Cu alloy is used as the first support wire 41 and the second support wire 42, it is preferable to adopt a Cu alloy oxide as a material of a part including the exposed surfaces. On the exposed surface 41A of the first support wire 41 and the exposed surface 42A of the second support wire 42, an insulating layer made of a resin may be stacked.

In the embodiment, the material forming the first support wire 41 and the second support wire 42 may be directly exposed from the exposed surfaces 41A.

In the embodiment, the dimension of the element body BD in the thickness direction Td is not limited to the examples of the embodiment. However, as described above, the smaller the dimension of the element body BD in the thickness direction Td becomes, the smaller the dimension protruding from the substrate in mounting the inductor component 10 on the substrate becomes, which is preferable. Specifically, the thickness may be preferably 0.25 mm or less.

In the embodiment, the dimension in the thickness direction Td of the first layer L1, i.e., the first inductor wire 20R and the second inductor wire 20L is not limited to the examples of the embodiment. However, as described above, the ratio is preferably one-tenth or more and one-third or less (i.e., from one-tenth to one-third) with respect to the dimension of the element body BD in the thickness direction Td.

In the embodiment, the pitch P1 from the center axis A1 of the first support wire 41 extending from the first inductor wire 20R to the center axis A1 of the first support wire 41 extending from the second inductor wire 20L is not limited to the examples of the embodiment. For example, the pitch P1, the distance Q1, and the distance Q2 may be disposed to be equal to each other.

In the embodiment, the compositions of the first inductor wire 20R and the second inductor wire 20L are not limited to the examples of the foregoing embodiments. For example, silver or gold may be used.

In the embodiment, the composition of the magnetic layer 50 is not limited to the examples of the embodiment. For example, the material of the magnetic layer 50 may be ferrite powder or a mixture of ferrite powder and metal magnetic powder.

In the embodiment, another layer may be interposed between the support wires 41 and 42 and the magnetic layer 50. For example, an insulating layer may be interposed between the support wires 41 and 42 and the magnetic layer 50.

In the embodiment, the first inductor wire 20R does not necessarily have to be in a linear shape. In order to acquire a suitable inductance value at the time of use, a connection portion may be provided. It should be noted that a plurality of connection portions may be provided in the first inductor wire 20R and the second inductor wire 20L.

In the embodiment, the inductor wire may be any inductor wire capable of imparting inductance to the inductor component 10 by generating a magnetic flux in the magnetic layer in the case in which an electric current is flowed. In the embodiment, the inductor wires do not necessarily have to reduce the DC electric resistance as compared with a spiral inductor wire having the same wire length.

In the embodiment, the first vertical wire 71 and the second vertical wire 72 do not necessarily have to extend solely in the direction orthogonal to the principal surface MF. For example, the first vertical wire 71 and the second vertical wire 72 only have to penetrate the second magnetic layer 55 on the occasion in which the first vertical wire 71 and the second vertical wire 72 are inclined to the thickness direction Td.

In the embodiment, the areas of the first pads 22R and 22L and the second pad 23R may be equal to the areas of the first vertical wires 71 and the second vertical wires 72 when viewed from the thickness direction Td. In addition, the dimensions of the lengths of the first pads 22R and 22L and the second pad 23R in the direction orthogonal to the direction of extending the wire main bodies 21R and 21L may be the same as those of the wire main bodies 21R and 21L.

In the embodiment, the first external terminal 81 and the second external terminal 82 may be omitted. When the first vertical wire 71 and the second vertical wire 72 are exposed from the principal surface MF, an electric current can be flowed from the first vertical wire 71 and the second vertical wire 72 directly to the first inductor wire 20R and the second inductor wire 20L. In this case, the part of the first vertical wire 71 exposed from the principal surface MF and the part of the second vertical wire 72 exposed from the principal surface MF function as external terminals.

In the embodiment, the metal layer of the terminal portion 80 is not limited to the material of the embodiment. A catalyst layer may be provided as necessary. For example, gold or tin can ensure solder wettability, nickel can suppress electromigration, and the metal layers of the external terminals 81 and 82 can be appropriately set corresponding to the functions.

In the embodiment, the outer surfaces of the first external terminal 81 and the second external terminal 82 may be covered with an insulating layer. In this case, in the state in which the inductor component 10 before being mounted on a substrate or the like is stored, it is possible to suppress carrying an unintentional current through the inside of the inductor component 10 with the external terminals interposed therebetween. In the case of this modification, before the inductor component 10 is mounted on a substrate or the like, cleaning or the like only has to be performed to remove the insulating layer covering the first external terminal 81 and the second external terminal 82.

In the embodiment, the dummy portion 83 do not necessarily have to have the same stacked structure as the first external terminal 81 and the second external terminal 82. For example, the dummy portion 83 does not necessarily have to be a material having conductivity. Furthermore, for example, the dummy portion 83 may be a portion where the second magnetic layer 55 is exposed from the insulating layer 90.

In the embodiment, the area of the dummy portion 83 when viewed from the thickness direction Td may be different from the areas of the first external terminal 81 and the second external terminal 82.

In the embodiment, the dummy portion 83 may have the same shape as each of the external terminals 81 and 82, or the dummy portion 83 does not necessarily have to be provided.

In the embodiment, the manufacturing method for an inductor component 10 is not limited to the examples of the foregoing embodiments. For example, in the first and second embodiments, the step of forming the first inductor wire 20R and the second inductor wire 20L and the step of forming the first support wire 41 and the second support wire may be different steps. For example, after the first inductor wire 20R and the second inductor wire 20L are formed, the support wires 41 and 42 may be formed of a material different from that of the first inductor wire 20R.

What is claimed is:

1. An inductor component comprising:
an element body having a principal surface;
a plurality of inductor wires disposed on an identical plane in the element body, the plurality of inductor wires extending in parallel with the principal surface; and
a first vertical wire and a second vertical wire extending in a thickness direction from the inductor wires toward the principal surface, the first vertical wire and the second vertical wire being exposed from the principal surface, wherein
each of the inductor wires has
a wire main body having a number of turns of 0.5 turns or less, the wire main body extending linearly,
a first pad provided at a first end of the wire main body, the first pad being connected to the first vertical wire, and
a second pad provided at a second end of the wire main body, the second pad being connected to the second vertical wire,
when one of the plurality of inductor wires is a first inductor wire and another is a second inductor wire, a wire length of the wire main body in the second inductor wire is 1.2 times or more a wire length of the wire main body in the first inductor wire, and
one of the first pad and the second pad in the first inductor wire is the same pad as one of the first pad and the second pad in the second inductor wire.

2. The inductor component according to claim 1, wherein
an inductance value of the second inductor wire is 1.1 times or more an inductance value of the first inductor wire.

3. The inductor component according to claim 1, wherein
a sectional area of the wire main body in a section orthogonal to a center axis of the wire main body is equal in all the plurality of inductor wires.

4. The inductor component according to claim 1, wherein
when viewed from the thickness direction,
the principal surface of the element body is in a rectangular shape,
the wire main body of the first inductor wire extends along one side of an outer edge of the rectangular shape of the element body, and
the first pad and the second pad of the second inductor wire are disposed at positions in symmetry across the quadrangular geometric center of the rectangular shape.

5. The inductor component according to claim 1, wherein
the wire main body of the first inductor wire extends linearly, and
in the plurality of inductor wires, the wire main body of an other inductor wire other than the first inductor wire includes two linear portions extending in different directions from each other and a connection portion connecting the linear portions to each other.

6. The inductor component according to claim 1, wherein
the wire main bodies of the plurality of inductor wires have a parallel portion extending in parallel with the wire main bodies of the inductor wires adjacent to each other, and
when a first direction is defined as a direction orthogonal to a direction in which the parallel portions extend and in which the parallel portions are arranged side by side,
a first distance is defined as a distance from a center axis of the parallel portion located on a first end side in the first direction to an end of the element body closest in the first direction to the parallel portion located on a first end side in the first direction,
a second distance is defined as a distance from a center axis of the parallel portion located on a second end side in the first direction to an end of the element body closest in the first direction to the parallel portion located on the second end side in the first direction, and
in the first direction, a pitch between the parallel portions is different in a dimension from the first distance and the second distance.

7. The inductor component according to claim 1, wherein
three or more of the inductor wires are provided, and
the wire main bodies of the plurality of inductor wires have a parallel portion extending in parallel with the wire main bodies of the inductor wires adjacent to each other.

8. The inductor component according to claim 7, wherein
the parallel portions adjacent to each other have different pitches.

9. The inductor component according to claim 1, wherein
three or more of the inductor wires are provided,
the wire main bodies of the plurality of inductor wires have a parallel portion extending in parallel with the wire main bodies of the inductor wires adjacent to each other, and
when a first direction is defined as a direction orthogonal to a direction in which the parallel portions extend and in which the parallel portions are arranged side by side, a ratio of each pitch to a mean value of the pitches of the parallel portions adjacent to each other in the first direction is from 85% to 115%.

10. The inductor component according to claim 1, wherein
the wire main bodies of the plurality of inductor wires have a parallel portion extending in parallel with the wire main bodies of the inductor wires adjacent to each other,
when a first direction is defined as a direction orthogonal to a direction in which the parallel portions extend and in which the parallel portions are arranged side by side,
a first distance is defined as a distance from a center axis of the parallel portion located on a first end side in the first direction to an end of the element body closest in the first direction to the parallel portion located on a first end side in the first direction,
a second distance is defined as a distance from a center axis of the parallel portion located on a second end side in the first direction to an end of the element body closest in the first direction to the parallel portion located on a second end side in the first direction,
when a mean value of each pitch, the first distance, and the second distance in the first direction of the parallel portions adjacent to each other is defined, and a ratio of each pitch to the mean value, a ratio of the first distance to the mean value, and a ratio of the second distance to the mean value are from 50% to 150%, respectively.

11. The inductor component according to claim 1, wherein the wire main bodies have a parallel portion extending in parallel with each other, and a minimum distance between the wire main bodies adjacent to each other in the parallel portion is 50 micrometers or more.

12. The inductor component according to claim 1, wherein an inductance value of the first inductor wire is from 1 nH to 10 nH.

13. The inductor component according to claim 1, wherein a dimension of the element body in the thickness direction is 0.25 mm or less.

14. The inductor component according to claim 1, wherein when viewed from the thickness direction, areas of the first pad and the second pad are larger than areas of the first vertical wire and the second vertical wire at a connection point of the first pad to the second pad.

15. The inductor component according to claim 1, wherein the element body includes a magnetic layer, the magnetic layer is an organic resin containing metal magnetic powder, and the metal magnetic powder is Fe-based metal powder, and a mean particle size of the metal magnetic powder is from 1 micrometer to 10 micrometers.

16. The inductor component according to claim 1, wherein the element body has a side surface perpendicular to the principal surface, and a support wire connected to the inductor wire and having an end exposed from the side surface.

17. The inductor component according to claim 16, wherein an area of an exposed surface of the support wire exposed from the side surface is larger than a sectional area of the support wire located in the element body, the sectional area being a section orthogonal to a center axis of the support wire.

18. The inductor component according to claim 16, wherein the element body includes a magnetic layer, and the support wire is directly in contact with the magnetic layer.

19. The inductor component according to claim 16, wherein a part of the support wire including an exposed surface exposed from the side surface is a Cu oxide or a Cu alloy oxide.

20. The inductor component according to claim 1, comprising:

a plurality of terminal portions exposed from the principal surface, wherein a part of the terminal portion is an external terminal electrically connected to the inductor wire, and another terminal portion among the terminal portions excluding the external terminal is a dummy portion that is not electrically connected to the inductor wire.

21. The inductor component according to claim 20, wherein a shape of the dummy portion is different from a shape of the external terminal.

22. The inductor component according to claim 20, wherein when viewed from a direction orthogonal to the principal surface, an area of the dummy portion is equal to an area of the external terminal.

* * * * *